United States Patent
Roths et al.

(10) Patent No.: US 10,547,613 B1
(45) Date of Patent: Jan. 28, 2020

(54) SIMPLIFIED ASSOCIATION OF DEVICES WITH A NETWORK USING UNIQUE CODES ON THE DEVICES AND SIDE CHANNEL COMMUNICATION

(71) Applicant: Amazon Technologies, Inc., Seattle, WA (US)

(72) Inventors: Andrew Jay Roths, Kenmore, WA (US); Omar Abdul Baki, Seattle, WA (US); Lior Shapira, Redmond, WA (US); Sudharsan Sampath, Chennai (IN); Kadirvel Chockalingam Vanniarajan, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 260 days.

(21) Appl. No.: 15/597,632

(22) Filed: May 17, 2017

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| H04L 9/32 | (2006.01) |
| G06F 21/33 | (2013.01) |
| H04W 12/06 | (2009.01) |
| G06F 21/62 | (2013.01) |

(52) U.S. Cl.
CPC ........ *H04L 63/0876* (2013.01); *H04L 9/3263* (2013.01); *H04L 63/101* (2013.01); *G06F 21/33* (2013.01); *G06F 21/6218* (2013.01); *H04L 63/102* (2013.01); *H04W 12/06* (2013.01)

(58) Field of Classification Search
CPC . H04L 63/0876; H04L 63/101; H04L 9/3263; H04L 63/102; G06F 21/33; G06F 21/6218; H04W 12/06
See application file for complete search history.

(56) References Cited

U.S. PATENT DOCUMENTS

| | | | |
|---|---|---|---|
| 9,009,805 B1 * | 4/2015 | Kirkby | G06K 9/00711 726/7 |
| 2006/0000910 A1 * | 1/2006 | Chong | H04W 28/18 235/462.15 |
| 2009/0313269 A1 | 12/2009 | Bachmann | |

(Continued)

*Primary Examiner* — Lynn D Feild
*Assistant Examiner* — Vadim Savenkov
(74) *Attorney, Agent, or Firm* — Davis Wright Tremaine LLP

(57) ABSTRACT

A device provisioning service (DPS) fields requests from unprovisioned devices so that those unprovisioned devices can obtain network credentials or other data used in provisioning the unprovisioned device. The DPS can identify the device securely and associate with a known user account, or the user provisioning the device can supply network credentials over a side channel after supplying a provision code indicative of possession of the unprovisioned device. The provision code can be unique to the unprovisioned device or a short-sequence code that is not necessarily unique, but that is sufficiently uncommon that a specific short-sequence code would not likely be used more than once at a time. In order to communicate with the DPS, a provisioning device might connect the unprovisioned device and the DPS. If the provisioning device is a trusted device, it can perform some of the steps otherwise required by the DPS.

20 Claims, 19 Drawing Sheets

(56) References Cited

U.S. PATENT DOCUMENTS

| | | | |
|---|---|---|---|
| 2014/0093079 A1* | 4/2014 | Scott | H04L 63/08 380/270 |
| 2015/0097689 A1 | 4/2015 | Logue et al. | |
| 2015/0172061 A1* | 6/2015 | Lee | H04W 12/04 713/176 |
| 2015/0181432 A1* | 6/2015 | Casu | H04N 5/77 726/4 |
| 2015/0372875 A1* | 12/2015 | Turon | H04W 76/10 370/254 |
| 2016/0020954 A1* | 1/2016 | Sundareswaran | H04L 41/0889 709/220 |
| 2016/0037118 A1* | 2/2016 | Lee | H04W 48/14 348/734 |
| 2016/0183180 A1* | 6/2016 | Garcia Martin | H04W 48/18 370/328 |
| 2016/0373418 A1 | 12/2016 | Stahl | |
| 2017/0195318 A1 | 7/2017 | Liu et al. | |
| 2018/0159899 A1 | 6/2018 | Sward et al. | |
| 2018/0176771 A1* | 6/2018 | Yang | H04L 9/0819 |
| 2018/0206117 A1 | 7/2018 | Stahl | |
| 2018/0225444 A1* | 8/2018 | Frenz | H04L 9/0841 |

* cited by examiner

SIMPLIFIED ASSOCIATION OF DEVICES WITH A NETWORK USING UNIQUE CODES ON THE DEVICES AND SIDE CHANNEL COMMUNICATION

BACKGROUND

When purchasing electronic devices, the out-of-box experience (OOBE) can be important. A consumer that is able to power up a newly purchased device and start to use it might be more pleased with the device compared to the case where the consumer needs to configure the device, run complicated processes, possibly debug problems, and the like before using the product. Some of those complexities can be alleviated by having the device programmed or configured with a user interface that displays information to the consumer and that also has a means for the consumer to input configuration information into the device to get the device set up. However, with the increasing number of devices without human interfaces, such as devices that are designed to communicate over a network as the primary method of sending and receiving data, the configuration process can become more difficult.

Security is also a consideration in setting up new devices. If all devices are unsecured, all networks are unsecured, and all servers are unsecured, then a new device might be able to find a wireless network connection, connect to a server and begin communications. However, this would entail considerable security risks, as servers typically should not necessarily trust all devices attempting communication, wireless networks typically should not allow for all unsecured communications, devices should not necessarily trust all wireless networks, and end users cannot be assured that unauthorized persons would not attempt to connect a destructive device to the end user's wireless network. In a secured environment, a new device would be first configured with security information, such as secret keys or passphrases, needed to connect to a secured network and/or secured servers and services.

This can be complicated for end users, so it might be desirable to have devices that can perform seamless processes for connecting to secured resources.

BRIEF DESCRIPTION OF THE DRAWINGS

Various techniques will be described with reference to the drawings, in which:

FIG. 18 is a block diagram of an example of computing hardware that might be present in a provisioning device, an unprovisioned device, a DPS or the like.

DETAILED DESCRIPTION

Figure 1:
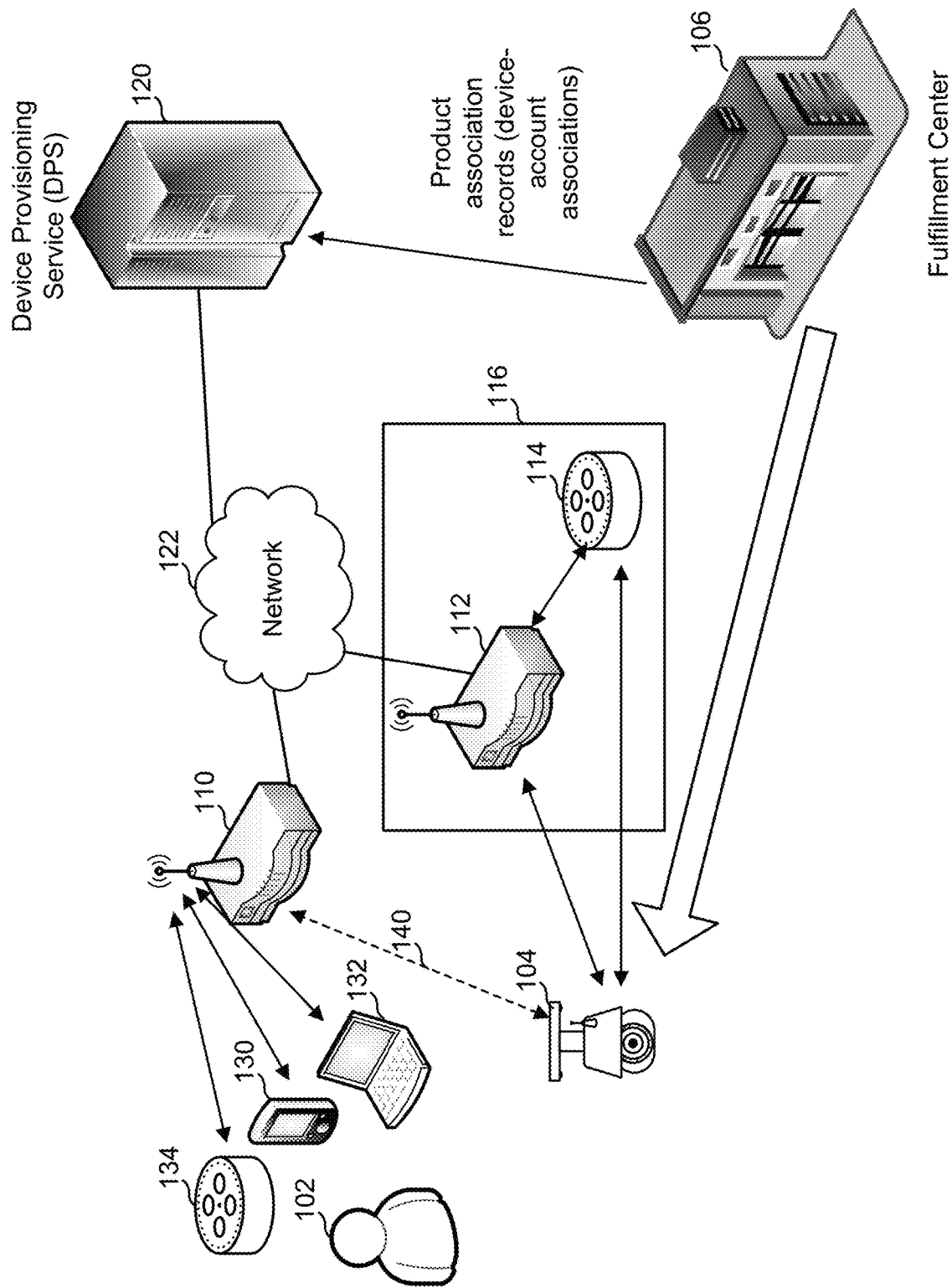
FIG. 1 illustrates a block diagram of an environment wherein a device might be associated to a secured network.

As described herein, various apparatus and processes are provided that can perform a zero-touch setup (ZTS) of a device. In a typical arrangement, an end user purchases a new networkable device, powers up the new device and the device securely obtains network credentials for the end user's wireless network (or wired network) and then uses those network credentials to connect to the end user's network. From there, perhaps it might connect to a wider network, such as the Internet. Of course, such a process can present a bootstrapping issue, as the device does not have network credentials at the time it is first attempting to access a network.

As referred to herein, the new device is an unprovisioned device. Once the new device has sufficient network credentials to communicate using the end user's network, the new device is then a provisioned device.

As referred to herein, the end user is a person, organization or the like that has an unprovisioned device that is to be connected to a network that is secured by, or for the benefit of the end user. The network can be a wireless network, or a wired network that might require one additional setup step of plugging in a network cable, but in the case of a wireless network, it might be possible for the end user to just power on a device and have that device become a provisioned device by obtaining network credentials from a secure server or service, where the secure server or service is able to authenticate the device as being an authorized device and securely communicate with the device, and where the device is able to authenticate the secure server or service as well and securely communicate with the secure server or service.

As referred to herein, a purchaser of a device refers to a person, organization or the like that purchases the device. The purchase can be in a manner where the purchaser is fully identified, such as where the purchaser logs into an online shopping service, identifies himself or herself and in connection with their account, orders the device for delivery. The purchase might instead be in a manner where the purchaser is not fully identified, such as where the purchaser purchases the device online without identification of their account or in a retail setting. The purchaser can be the end user or an agent of the end user, but that need not be the case. For example, a purchaser might purchase the device as a gift for another. Unless otherwise indicated herein, an agent of the end user can be an equivalent of the end user for the purposes of this disclosure.

In a more general case, the purchaser of the device can instead be referred to as an acquirer of the device, as the manner in which the device came into the possession of the acquirer can vary. It is generally desired to have the newly purchased or acquired device be newly connected to the end user's network and it may be that the newly purchased or acquired device had previously been connected to a prior owner's network, or even previously have been connected to the end user's network but is no longer provisioned for the end user's network. The latter case might occur after a factory reset of the device, a reconfiguration of the end user's network, or for other reasons. For whatever reason, the device would be "new" to the end user's network environment and therefore is unprovisioned as to that network.

A device provisioning service (DPS) fields requests, among possibly other operations, from unprovisioned devices so that those unprovisioned devices can obtain network credentials or other data used in provisioning the unprovisioned device. The DPS responds with the network credentials or other data. For security reasons, the DPS should not respond to any request without being able to authenticate that (1) the requesting device is legitimate, (2) the network for which the requesting device is requesting data is a network owned or controlled by the end user in valid possession of the requesting device, and (3) the requesting device is unprovisioned as to that network (and perhaps also requiring that the requesting device be presently unprovisioned as to any other network).

For example, in a specific scenario, an end user operates their home wireless network and purchases a device that they want to have attached to their home wireless network. The device might be an Internet of Things (IoT) device that provides some functionality and is connected to the Internet via that home wireless network but doesn't necessarily have a physical user interface built into the device. The wireless network can also be for other environments besides a home. In the general case, the provisioning data need not be limited to network credentials, but could instead be, or include, data useful for making the unprovisioned device be a provisioned device and once provisioned, be considered by the end user to be more conveniently installed to the end user's benefit that the unprovisioned device. For example, the network credentials might include an SSID of a wireless network, an encryption type for that network, and a passphrase for that network. The additional data might include settings for a device to be provisioned, such as language preferences and other customer settings or device preferences. As a result, the process described here can set up a device for more than just network access.

In that scenario, the end user might have purchased the device online via an online shipping system that sends orders for physical goods to a fulfillment system at a fulfillment center. The operator of the fulfillment system might have shipped the device to the end user and in doing so, recorded an association between the shipped device and the end user. That association, a device-end user association, can be communicated from the fulfillment system to the DPS, which then can wait and listen for a communication from the device. At some prior time, the end user might have supplied to the DPS, in a secure manner, the end user's home wireless network credentials. The device-end user association might be in the form of a data record included in an electronic message passed from a computer of the fulfillment system to the DPS according to some predefined messaging protocol.

In a typical scenario, the end user receives the device and powers it up. The device might be programmed to try one or more approaches to securely contacting the DPS to obtain the end user's home wireless network credentials. The contact might be via the end user's home wireless network, a nearby open wireless network (a "neighbor network") that is not necessarily trusted and that doesn't necessarily trust the device, or by another device that is a "ZTS-aware" device.

The other ZTS-aware device could be a device that is already provisioned on some network such that the other ZTS-aware device is able to securely communicate with the DPS on behalf of the device being provisioned. The other ZTS-aware device could be a device trusted by the end user, such as a device that the end user has control over and had previously provisioned for the end user's home wireless network, or the other ZTS-aware device could be a device in some other domain that is not necessarily trusted. For example, the new device might be an Amazon Echo™ device purchased by a consumer for setup in his or her home to be connected to their secured home wireless network and the other ZTS-aware device might be an Amazon Echo™ device operated by a next-door neighbor that is within range.

It may be the case that the other ZTS-aware device does not trust an unprovisioned device, such as in the "neighbor case," and it may be that the ZTS-aware device and the unprovisioned device that is attempting a ZTS provisioning process as described here do not generally trust each other, but trust each other enough to interact for the purposes of provisioning. As explained herein in various places, the different levels of trust can be addressed by certain protocols being followed on the part of the device, a provisioning ZTS-aware device, a network, and/or the DPS.

The DPS maintains secured databases of network credentials for multiple end users. The DPS may also maintain secured user accounts databases so that end users can log in and update their specific network credentials. In some variations, the network credentials are stored separately in a secured credentials storage system and supplied to the DPS upon request and validation. In some configurations, a separate device management system (DMS) stores databases of user account information, purchasing details, history of device provisioning, etc. In that configuration, the DPS might not need to maintain user account associations or network credentials, but can just send an electronic message request to the DMS asking for network credentials to go with a device that contacted the DPS, then the DMS identifies the end user, looks up the end user's account details and then uses that to send an electronic message request to the secured credentials storage system to obtain those network credentials and provide them to the DPS. The DPS can then provide those to the device so that the device can securely provision itself.

Where the DPS and the fulfillment system are operated by the same entity, a fulfillment center might have a procedure whereby ZTS-enabled devices have their packaging scanned prior to shipping to an identified account holder and in that manner, the DPS would have a record of which account and end user is associated with the to-be-shipped device. Alternatively, the associations are stored with the DMS.

In other approaches, such as where the DPS is not able to associate a device with an account prior to shipping or purchase by the end user, the device might include a provision code somewhere on the device, on the packaging, or in a package insert, preferably being internal device packaging not visible until the packaging is opened. The end user can then supply the provision code to the DPS via a side communication channel so that the DPS would then have the association of the device with the end user's account. A side channel device that the end user might use to supply the provision code to the DPS via a side channel might be the end user's computer with a browser, a smartphone app, or other side channel device. From that information, the DPS would know what network credentials to provide to the unprovisioned device during provisioning. By having the provision code being not visible until the packaging is opened, that would make it more difficult for a hacker to read provision codes off of device packaging in a retail outlet and later cause the DPS to provision devices that hacker did not purchase.

The provision code can be in a number of forms. It might be in the form of a two-dimensional (2D) barcode. The end user could scan a two-dimensional printed barcode image using a web-enabled camera, a smartphone, other device having a camera interface or the like, to generate a data representation of the provision code into memory, and then send that image to the DPS to provide the DPS with the association between that specific device and the end user's account. The provision code might be in the form of a sequence of alphanumeric characters. That might not be convenient for the end user to enter a long string of alphanumeric characters, such as where the provision code includes a product identifier (such as a UPC), a model number, a unique serial number for device within a manufacturer's namespace, and a device public key of the device, which can result in a provision code being 80 to 150 characters or more. In those cases, a short-sequence variation for the provision code might be used.

On the manufacturer's end, not much is required. They would generate the 2D barcode for the provision code on their device and/or packaging, with the short-sequence codes and internally support private keys and ZTS operations. The unique serial number for device within a manufacturer's namespace might be a device serial number or an industry unique code, such as an IMEI.

For a short-sequence variation, all the components of the provision code might not be supplied by the short-sequence code, but instead those components are provided to the DPS by the device itself, in a secure manner, and the short-sequence code is used primarily to prove that the end user has possession of the device being provisioned. For example, the short-sequence code might be a human readable short sequence, such as 4- or 8-digit value and need not be unique. The short-sequence code might be printed on the device and/or packaging. The device might also have the 2D barcode of the full provision code, so that can be used if the end user has easy image capture capability of a smartphone app, or the like, and the end user can use the short-sequence code if not.

In a variation of the use of the short-sequence code, instead of it being a digit sequence, it might comprise a sequence of words such as a sequence of eight words (e.g., "apple rainbow fox chop orange label red cats") that can be spoken to a listening device (e.g., the Alexa service on an Amazon Echo™ device). In the variation that uses words, the words might be selected for ease of use independent of customer language. If the end user is using an interactive side channel to convey an association of the device to the end user's account, such as where the end user is speaking with the Alexa service on an Amazon Echo™ device to provision the unprovisioned device, the interaction might provide hints to the user. For example, the end user might start with "Alexa, please set up my new wireless door monitor." The end user's Amazon Echo™ device might reply with "You asked to start setting up a new device. Please read the sequence of words that appear on the bottom of the device or in the packaging. They start with the word 'apple' followed by five to eight other words." Then, when the wireless door monitor is powered up, it contacts the DPS, identifies itself. The DPS and the wireless door monitor authenticate each other and once the DPS determines that the wireless door monitor is the one that the end user is provisioning, the DPS can send the wireless door monitor the end user's network credentials and other data as needed. Preferably, the short-sequence code, whether a sequence of digits, characters, spoken words, or other sequence, is long enough that it would be unlikely for two devices to be in the process of provisioning at the same time from two unrelated end users.

Such short-sequence code might be a printed code in human-readable form and visible only after the new device is unpackaged from packaging materials, wherein the printed code corresponds to a stored code available to the device provisioning server and present in a data record that provides a device-code association associating the printed code with the new network-enabled device. The DPS and other elements might maintain a data structure that provides a mapping of words to numbers used for short-sequence codes, so that when words are provided to the DPS instead of numbers, the DPS can still associate the new device with an end user of the target wireless network by parsing a short-sequence code provided by the end user into a sequence of words, looking up a mapping of words to numbers used for short-sequence codes, and converting the word-based short-sequence code into a numerical short-sequence code to use as the short-sequence code.

For secure communication, the new device may be manufactured with a device private key that cannot be extracted but can be used internally by the device. The new device may also have stored internally its short-sequence code, its provision code that is represented by the unique code in a 2D barcode printed on the device, a serial number and possibly also public keys of the DPS.

The approaches described herein include approaches for getting an unprovisioned device to be provisioned so as to provision a newly acquired device. Similar approaches can be used in the case where an end user has many devices that need to be provisioned, such as where the end user makes changes to their wireless network that causes all existing provisioned devices to then effectively be unprovisioned devices.

Specific examples, with reference to the figures will now be described. In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a block diagram of an environment wherein a device might be associated to a secured network. As shown in FIG. 1, an end user 102 is to set up a device 104 obtained from a fulfillment center 106. At this point, device 104 is an unprovisioned device, i.e., a network-enabled device that is in an unprovisioned state where the network-enabled device lacks network credentials to connect to a target wireless network. It could be that devices can be custom programmed before shipping with customer details and network credentials of the ultimate end user, but in many cases, that is impractical. Thus, it will typically be the case that device 104 is initially not able to access a wireless router 110 of the end user's network because wireless router 110 might be secured with a hidden SSID and protected by a password and device 104 does not ship preloaded with all of those details. Device 104 can communicate with unsecured networks and/or devices that will communicate with device 104 notwithstanding it being unprovisioned.

For example, device 104 might, upon being powered up, automatically look for an open wireless network, find one (such as the network provided by a wireless router 112, in this example) and use it to contact a device provisioning service (DPS) 120 over a network 122. Networks 112 might be the Internet or another type of network. If DPS 120 was provided with ordering details from fulfillment center 106, such as a unique device identifier and an account identifier of end user 102, and DPS 120 has previously securely stored the network credentials of end user 102 or has access to them, DPS 120 can provide those network credentials to device 104, but preferably some authentication occurs prior to that, to reduce the chance of hackers spoofing devices they do not control. In this manner, device 104 can become a provisioned device without any interaction involving end user 102.

In some configurations, ZTS-aware devices might be used to respond to requests from unprovisioned ZTS-enabled devices. For example, a voice-activated interface device 114 might field such requests. Voice-activated interface device 114 might be part of a neighbor network 116 that is not necessarily controlled by end user 102 or trusted by end user 102. Since neighbor network 116 is not controlled by end user 102, that generally precludes performing provisioning operations that involve reconfiguring network devices in neighbor network 116, having them run proxies, having them disconnect from their existing networks to serve as an access point for device 104, or similar potentially disruptive network operations. For example, some devices get set up by having the device broadcast that it is an access point for a wireless network it sets up itself. To connect to that setup wireless network, another device might have to disconnect from its current network, connect to the setup wireless network, communicate with the device to provide configuration information, then reconnect to its usual network. This can be disruptive, and might not be desirable where the other device is on a neighbor network or where the other device takes a long time to switch networks.

DPS 120 might not have an association between device 104 and end user 102. This can occur where end user 102 purchased device 104 in a channel where the end user's account was not used in the transaction, where the purchaser is distinct from the end user, where the end user is changing the association, or for other reasons. In such instances, end user 102 can obtain a provision code or a short-sequence code from device 104 (or the packaging of device 104). End user 102 can then use a smartphone 130, a desktop computer 132, or a voice-activated interface device 134 to interact with DPS 120, perhaps via a web browser or an app. End user 102 can then log in or otherwise indicate to DPS 120 the end user's account and then provide the provision code or the short-sequence code. A result of this interaction is that DPS 120 would then have an association between device 104 and end user 102. Associations might be stored as records in an associations database maintained by DPS 120 or as part of a user account database. Once provisioned, device 104 can associate with, and communicate via, a wireless connection 140 with wireless router 110.

Figure 2:
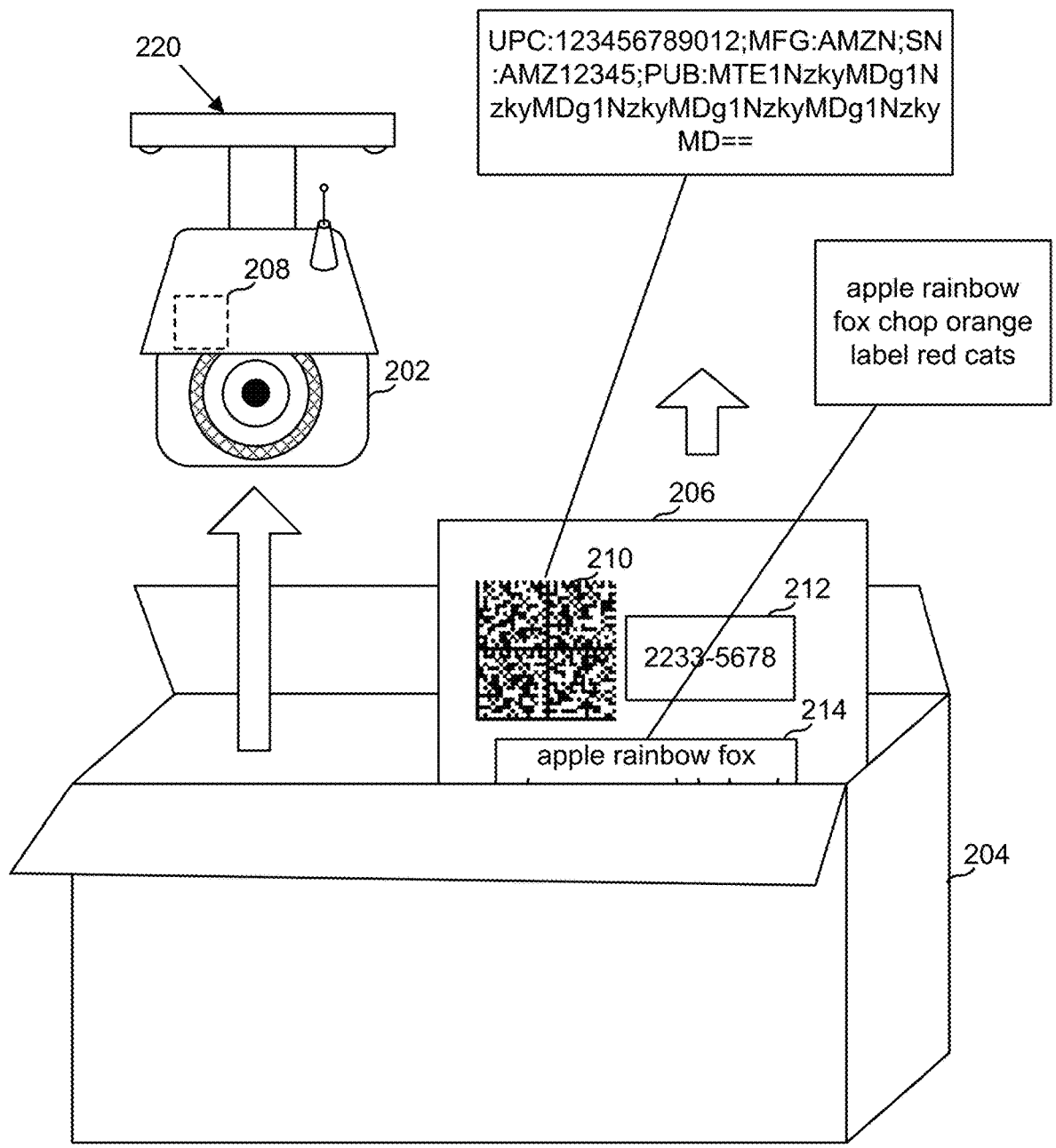
FIG. 2 illustrates an example of a device that might be purchased and require credentials.

FIG. 2 illustrates an example of a device that might be purchased. In this example, the unprovisioned device is a wireless security camera 202 that is sold boxed in a box 204 such that an insert card 206 is not visible until wireless security camera 202 is unpacked from box 204. Wireless security camera 202 includes internal processing capability 208, such as a processor, a wireless network interface, readable and writeable memory, and permanent storage for data specific to wireless security camera 202, such as a private key, serial number and provision code details for that device.

Insert card 206 contains a 2D barcode 210 that encodes various data elements of wireless security camera 202. Insert card 206 also includes a short-sequence code 212 (2233-5678) and a short-sequence code using words 214 ("apple rainbow fox chop orange label red cats"). For some devices, this information might be printed on the device itself. For a security camera, this might be on a surface 220 that is not publicly visible after installation. For ease of use, it might be preferable that the information be printed on the device itself, in case the end user loses the insert.

The devices might have serial numbers visible on the device and/or the packaging, but the provision code can include more information so that a DPS can tell that the requester has possession of the device being provisioned. Otherwise, it might be possible for a hacker to connect to the DPS, associate the hacker's account with someone else's device and then have the DPS communicate the hacker's credentials to the device.

The 2D barcode might encode for the following fields:
"UPC": indicating the type of data to follow
A Universal Product Code (UPC) for the device
"MFG": indicating the type of data to follow
A manufacturer identifier
"SN": indicating the type of data to follow
A unique serial number provided by the manufacturer for the specific device
"PUB": indicating the type of data to follow
A hash of the public key of the device (such as an ECC-256 key in base64 form)

The 2D barcode might also include fields for the short-sequence codes of the device, but that need not be the case. The fields of the 2D barcode might be provided to the DPS in electronic form, or they can be scanned off of each device. The device bearing that 2D barcode will have an internal private key provided by the manufacturer that is not accessible outside of the device, where the internal private key and the printed public key form an asymmetric key pair. Manufacturers would also program their devices to perform the ZTS process when a device is not provisioned. By using elliptic curve code based keys, shorter keys can be used. For example, ECC-224 has equivalent security to RSA-2048.

The hash of the public key of the device might be signed using a private key of the manufacturer. This allows the DPS to validate that the device is not a counterfeit device during the provisioning process, as a counterfeit device maker would have difficulty generating a valid hash of the counterfeiter's public key if it needed to be signed by a private key unknown to the counterfeit device maker.

The short-sequence key might be used in a Password Authenticated Key Exchange (PAKE) process such as J-PAKE in order to validate that the DPS and the end user both have the short-sequence code. In the word version of the short-sequence code, eight words selected from a set of ten words might be used. Alternatively, the equivalent of an 8-digit short-sequence code could be a four word sequence where the words are selected from a set of 100 possible choices for each word.

Figure 3:
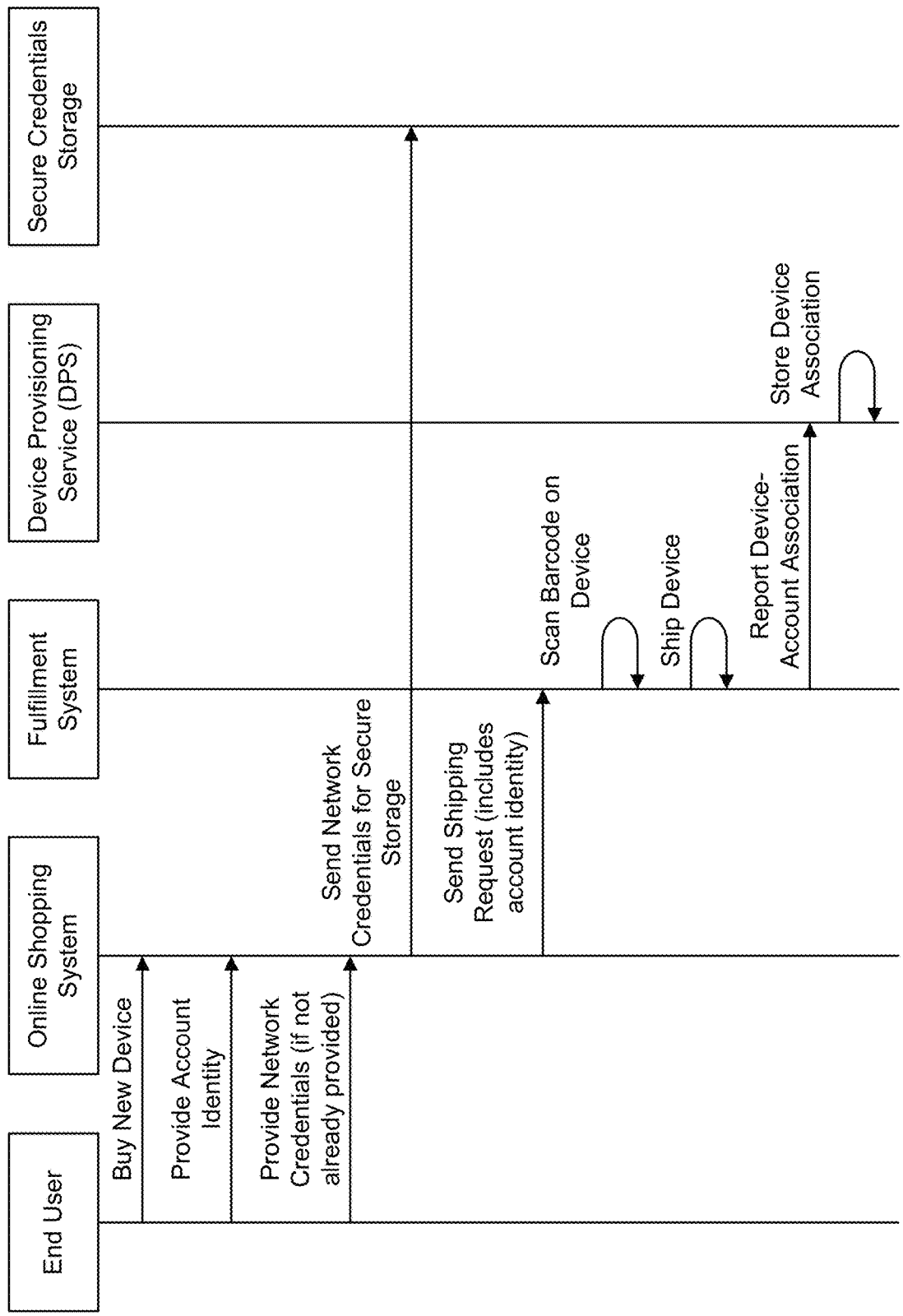
FIG. 3 is a swim diagram illustrating interactions that occur upon purchase of a zero-touch-setup-enabled device.

FIG. 3 is a swim diagram illustrating interactions that occur upon purchase of a ZTS-enabled device, in the case where the end user identity is provided at time of purchase. This might be the case where the end user logs into an online shopping site, identifies themselves and orders a device. Each of the operations illustrated with an arrow in FIG. 3 might represent an electronic message or messages, according to some protocol, between the element sending the message and the recipient. For example, buying a new device might be effected by a web browser of the purchaser sending the appropriate HTTP messages with a web server of the seller of such devices. Other operations might be internal processes, such as a fulfillment center shipping a device, that may also include changes in some electronic records. Thus, shipping a device can include physically initiating a shipping process, but also updating a fulfillment database with a record indicating the shipping details.

Once the end user purchases the device, if not already provided, the end user can provide their network credentials. Where the purchasing is done via a device that is suitably programmed, that device might ask the end user if they would like their network credentials uploaded to the online shopping system for later seamless integration.

The online shopping system would then prepare the order, send the network credentials to secure storage, and send a shipping request to a fulfillment center. The shipping request might include shipping information, account identity, product selection, etc. At a fulfillment center, the product is picked for shipping and the specific item being shipped is scanned so that the barcode on the device is obtained. This barcode can be the 2D barcode on the device that forms the provision code or a different barcode that is later associated with the device's provision code. The fulfillment center then ships the device and reports the device-account association to the DPS. At that point, the DPS knows the device identity, knows the end user account and can obtain network credentials for the end user using that account identity from the secure credential storage, once the DPS hears from the device. In some instances, the DPS and the secure credential storage might be integrated.

In a variation of this process, in which the purchaser knows that the device is not going to be provisioned on that purchaser's own network, the purchaser can signal to the online shopping system to that effect, such as indicating that it is a gift. In such cases, the DPS would behave differently when it hears from the device.

Figure 4:
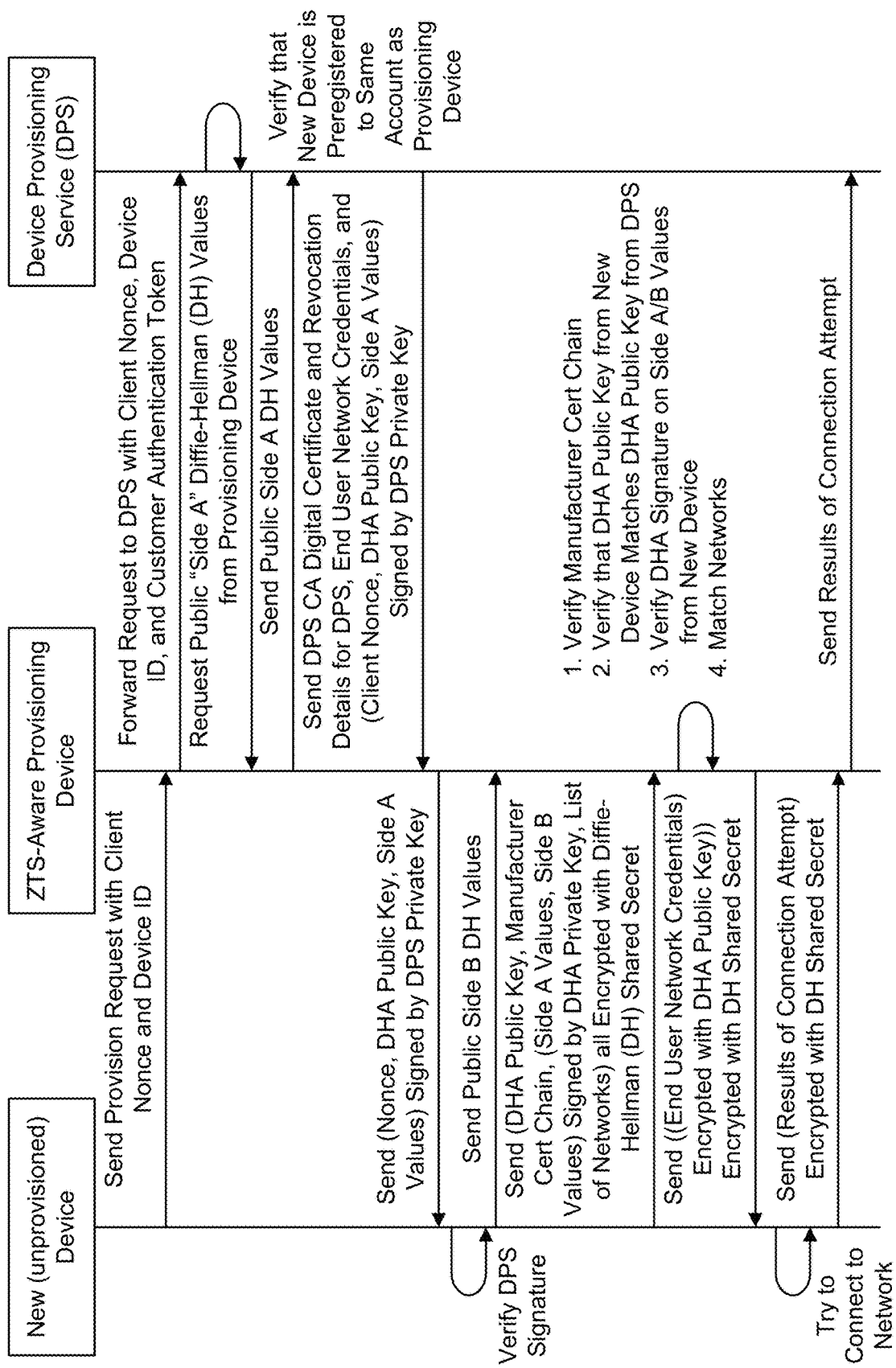
FIG. 4 is a swim diagram illustrating interactions between a new device to be provisioned, a provisioning device that responds to requests from the new device, and a device provisioning service (DPS).

FIG. 4 is a swim diagram illustrating interactions between a new device to be provisioned, a provisioning device that responds to requests from the new device, and a device provisioning service (DPS). The provisioning device is network-connected, so it can communicate with the DPS. In this example, it is assumed that the provisioning device is ZTS-aware, such as voice-activated interface device (although the voice-activation capabilities would not necessarily be used). The interactions shown in FIG. 4 might begin after the new device is powered up, runs its internal self-checks, and then determines that it is an unprovisioned device. That process might be driven by program code stored in the new device and executed by a processor in the new device.

In a first step, the new device powers up and determines that it needs to be provisioned. It then sends a provisioning request message or advertisement out to any listening ZTS-aware provisioning devices. This might be done via a Bluetooth advertisement message or other method. Assuming a ZTS-aware provisioning device on the end user's network (the network the new device is to be connected to) picks up the advertisement, it can forward the request to the DPS. If the advertisement does not already include a client nonce and a unique identifier of the new device, the ZTS-aware provisioning device can request that before forwarding the request to the DPS. The unique identifier of the device can be the provision code or other unique identifier generally known only to a possessor of the new device or known to the device itself. The DPS determines the device's identity (but has not yet authenticated that the device is really that device). The request from the ZTS-aware provisioning device can also include a customer authentication token. As between the ZTS-aware provisioning device and the DPS, the customer authentication token can be used for verifying, at the DPS, that the ZTS-aware provisioning device is authorized by the end user to perform the provisioning tasks.

If the DPS determines that that device identity is not associated with an end user account known to the DPS, it can reply to that effect or take no action. This might be the case where the device was purchased online and the purchaser indicated that it was a gift, or where the device was purchased in a retail channel or online channel that did not ask for or obtain an account identity of the purchaser. The device might be programmed to provide a limited user interface response to this situation, such as flashing an LED on the device. Such cases are addressed in later figures and accompanying descriptions.

If the DPS determines that that device identity is associated with an end user account known to the DPS and that the provisioning device is associated with that same end user account, the DPS requests from the provisioning device a set of Diffie-Hellman public values for a Diffie-Hellman exchange process. In response, the provisioning device sends the "Side A" Diffie-Hellman public values it generates.

In a Diffie-Hellman exchange process, a first device computes one or more values ("Side A" values) in a particular manner and sends those Side A values to a second device over a connection that is possibly insecure and available for eavesdropping. When the second device receives the Side A values, it computes one or more values, the "Side B" values, and sends the Side B values to the first device, possibly also subject to eavesdropping. At this point, the first device knows the Side A values, how the Side A values were calculated, and the Side B values, whereas the second device knows the Side B values, how the Side B values were calculated, and the Side A values. From that knowledge, the two devices can compute a shared secret, the DH shared secret, that can be used for secure communications between the two devices over a possibly insecure network. A characteristic of the Diffie-Hellman exchange process is that an eavesdropper knowing only the transmitted Side A values and transmitted Side B values, but not how the Side A values were calculated or how the Side B values were calculated, cannot determine the DH shared secret in a computationally tractable manner.

The DPS also maintains a device hardware authentication (DHA) public-private key pair that is encoded into the devices before being shipped. When the DPS receives the Side A values, it sends the provisioning device the CA digital certificates and revocation details for the DPS, end user network credentials, as well as a number of elements (client nonce, DHA public key, Side A values) signed by the DPS private key held by the DPS for which the new device has the DPS public key (or can obtain it using the certificate chain). The use of the client nonce helps prevent replay attacks. One consideration is how available the DHA shared secret key is, whether it is possible to compromise it, and whether the same shared secret key is used for multiple devices.

The ZTS-aware provisioning device then sends the new device a message containing the nonce, the DHA public key and the Side A values that were all signed by with DPS with the DPS private key. The new device can verify a DPS signature before proceeding. The DPS signature can be used as network credentials signature to indicate that network credentials are unaltered after being sent by the DPS and that the DPS signed their values. In one example, the ZTS-aware provisioning device also sends the new device the CA digital certificate and revocation details for the DPS for the new device to use in verifying the DPS signature. Once the new device has verified the DPS signature, it generates Side B Diffie-Hellman values and sends those to the ZTS-aware provisioning device. Since the ZTS-aware provisioning device generated the Side A Diffie-Hellman values, it has enough information to generate the Diffie-Hellman shared secret that is shared with the new device, so all subsequent communications can be encrypted using that Diffie-Hellman shared secret. As illustrated, the new device sends the ZTS-aware provisioning device the new device's copy of the DHA public key, a certificate chain of the device manufacturer, the Side A values, and the Side B values, all signed by the DHA private key. This is usable to show that the new device is authorized, at least because it has possession of those data elements. The new device also sends a list of networks to the ZTS-aware provisioning device that the new device can see (but not necessarily connect to).

With that information provided by the ZTS-aware provisioning device, the ZTS-aware provisioning device can then verify the certificate chain of the device manufacturer provided by the new device to determine whether to trust the new device, verify that the DHA public key provided by the new device is the same as the one provided by the DPS, and verify the DHA signature (using the DHA public key) on the Side A and Side B values to further check that the new device is legitimate. If all those tests are passed, the ZTS-aware provisioning device then checks the list of networks provided by the new device against networks known to the ZTS-aware provisioning device, selects one that matches and securely transmits the selected network's credentials to the new device, encrypted with the DHA public key and encrypted using that Diffie-Hellman shared secret. Where the new device has possession of the DHA private key, which legitimate devices will, the new device can then decrypt and have the network credentials.

With the network credentials, the new device will try to connect to the network and optionally report back the results to the ZTS-aware provisioning device, encrypted using that Diffie-Hellman shared secret, which the ZTS-aware provisioning device decrypts and optionally reports to the DPS.

Once confirmed, the DPS can record in its device database (or send a message to a system that maintains the device database) that the particular device is provisioned. Then, if the device appears subsequently for provisioning the DPS can require additional confirmation steps from the end user or a new owner of the device. Where desired, the DPS can also report the provisioning and perhaps end user contact info, with the end user's permission, to the manufacturer of the device. In this manner, the manufacturer registration is also seamlessly handled.

Figure 5:
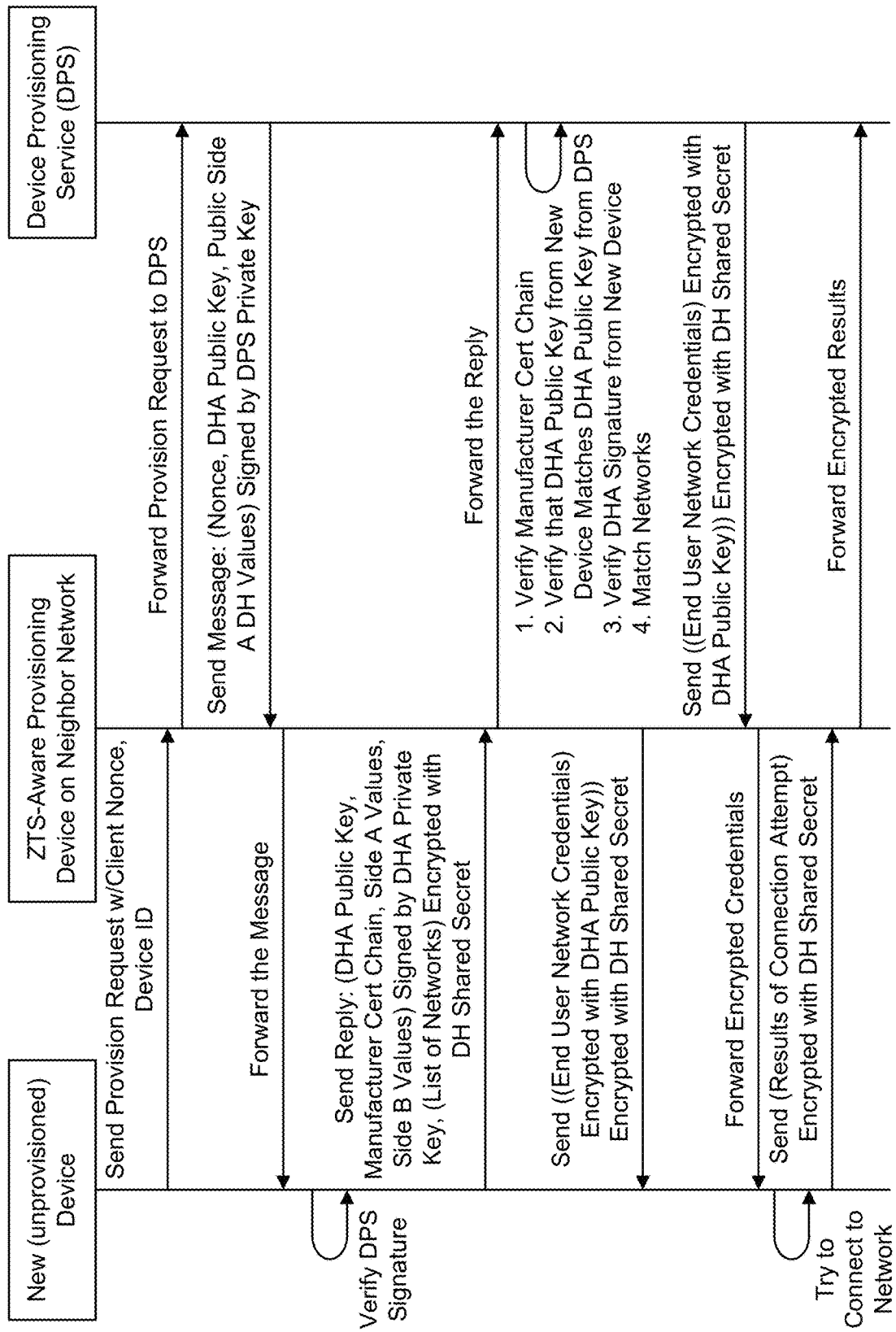
FIG. 5 is a swim diagram illustrating a variation of the interactions shown in FIG. 4.

FIG. 5 is a swim diagram illustrating a variation of the interactions shown in FIG. 4, where the ZTS-aware provisioning device is not within a trust boundary of the end user and the end user's trusted network. This might be the case when the ZTS-aware provisioning device is on a nearby or neighboring network, but is nonetheless a device that understands the ZTS onboarding process. In such environments, the network credentials of the end user should not be exposed to the neighbor network device and the neighbor network should not be significantly burdened or connectivity disturbed.

As shown in FIG. 5, the process begins when the new device sends a provisioning request, which might be in the form of a Bluetooth™ advertisement message. The process might be driven by program code stored in the new device and executed by a processor in the new device. In a first step, the new device powers up and determines that it needs to be provisioned. It then sends a provisioning request message or advertisement out to any listening ZTS-aware provisioning devices and the message is received by a ZTS-aware provisioning device on a neighbor network. The ZTS-aware provisioning device simply forwards the request to the DPS and the request includes a client nonce and a unique identifier of the new device.

In response, the DPS sends a message to the ZTS-aware provisioning device that includes the client nonce, the DHA public key, and the Side A values, all signed by the DPS private key held by the DPS. The ZTS-aware provisioning device forwards the request to the new device. At this point, no private information has been conveyed.

The new device can verify the DPS signature before proceeding. Once the new device has verified the DPS signature, it generates the Side B Diffie-Hellman values and sends a reply that contains the new device's copy of the DHA public key, a certificate chain of the device manufacturer, the Side A values, and the Side B values, where the Side A/B values are signed by the DHA private key. The ZTS-aware provisioning device forwards the request to the DPS. The reply can include a list of networks the new device sees and that list can be encrypted using the Diffie-Hellman shared secret. Once the DPS receives the reply, it would possess the Side B values and be able to compute the Diffie-Hellman shared secret and obtain the list of networks, which is not available to the ZTS-aware provisioning device on the neighbor network.

With that information provided by the new device, the DPS (rather than trusting or burdening the ZTS-aware provisioning device on the neighbor network) can verify the certificate chain of the device manufacturer provided by the new device to determine whether to trust the new device, verify that the DHA public key provided by the new device is the same as the one the DPS has, and verify the DHA signature (using the DHA public key) on the signed values to further check that the new device is legitimate. If all those tests are passed, the DPS then checks the list of networks provided by the new device against networks known to the DPS to be associated with that device unique identifier. If there is a match, the DPS determines the network credentials that the end user had previously specified and transmits those to the new device, via the ZTS-aware provisioning device, encrypted with the DHA public key and encrypted using the Diffie-Hellman shared secret.

With the network credentials, the new device will try to connect to the network and optionally report back the results to the DPS, via the ZTS-aware provisioning device, encrypted using the Diffie-Hellman shared secret.

Once confirmed, the DPS can record in its device database (or send a message to a system that maintains the device database) that the particular device is provisioned. Then, if the device appears subsequently for provisioning the DPS can require additional confirmation steps from the end user or a new owner of the device. Where desired, the DPS can also report the provisioning and perhaps end user contact info, with the end user's permission, to the manufacturer of the device. In this manner, the manufacturer registration is also seamlessly handled.

In another variation, the new device is able to connect to an open wireless network and contact the DPS directly, in which case the communications of FIG. 5 can flow directly between the unprovisioned new device and the DPS.

In the examples of FIG. 4 and FIG. 5, the DPS had a database or data usable to associate the unique identifier of the device with the end user and a database or data usable to associate the end user with a set of network credentials (for that end user's wireless network, for example). This might be the case where the end user was identified at the time of purchase and gave permission for such associations to be made. In subsequent examples to be described, the DPS does not know in advance those associations.

Figure 6:
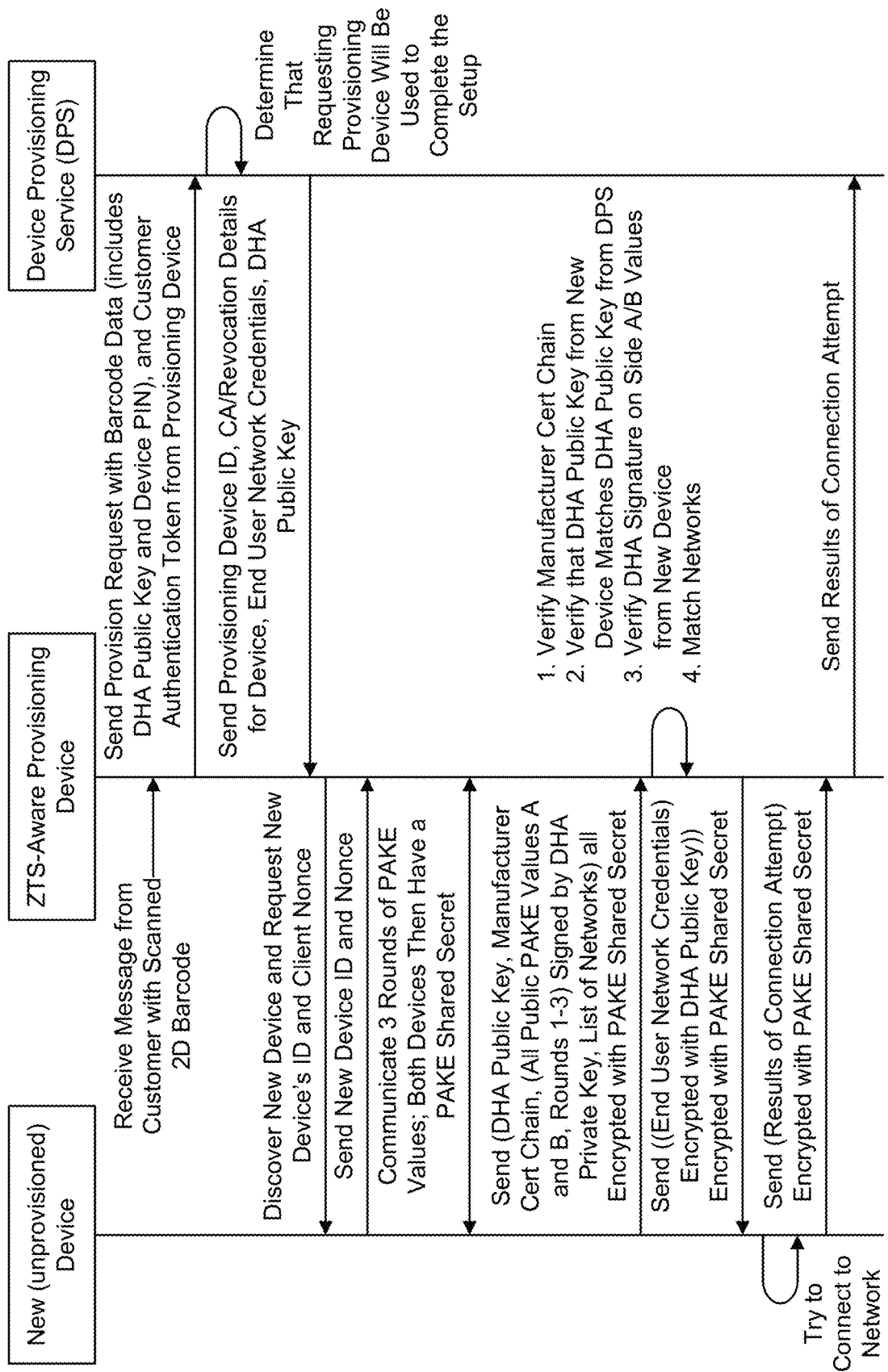
FIG. 6 illustrates a case where a provisioning device receives a scanned barcode from an end user.

FIG. 6 is a swim diagram illustrating a process wherein a device is provisioned onto an end user's network and the data associating a new device with the end user's network is done using a scanned barcode, or variation, and using a ZTS-aware provisioning device. As with the examples of FIG. 4 and FIG. 5, where the ZTS-aware provisioning device is on the end user's own network, it might be trusted and might be tasked with some operations needed to provision the new device, whereas where the ZTS-aware provisioning device is on a neighbor network, it can be treated as an untrusted device and the impositions on that device and neighbor network might be minimized.

The process of FIG. 6 begins with the ZTS-aware provisioning device receiving a provision code, such as might be represented by a 2D barcode, where the ZTS-aware provisioning device is provisioning for its own network. It should be understood, that unless otherwise indicated, the teachings here could be used with other forms of provision codes, but in several examples here, the provision code is provided as a lengthy, machine-readable data sequence, or a shorter, possibly human-readable sequence, or some combination. Via one or more means, as described herein, the end user (1) proves access to the provision code, and (2) provides that code. Access to the provision code could be used as a proxy for proving possession of the new device. However obtained, the end user (or an agent of the end user) sends a message to the ZTS-aware provisioning device with the provision code.

The message is received by the ZTS-aware provisioning device, which then sends a DPS a provision request including the provision code (which includes a DHA public key, a device PIN, and other details) and a customer authentication token from the provisioning device. The DPS determines whether to use the requesting provisioning device or another provisioning device, which it can do if it has associations between the device PIN and the end user. This association might be unique if the device PIN does not collide with another device PIN being provisioned at the same time. The DPS might determine that the ZTS-aware provisioning device is a neighbor network device or a device that is not on the target network or unable to communicate with the new device easily, etc., and determine, based on the device PIN, that there is a more suitable ZTS-aware provisioning device to use. In the example of FIG. 6, the DPS uses the same ZTS-aware provisioning device that sent the request. Subsequent figures show other examples. In some cases, the DPS does not know the association, as perhaps the end user purchased the new device through a channel that did not identify the end user or the end user did not provide that information, as might be the case where the new device was purchased through an offline retail store or given as a gift.

The DPS sends the ZTS-aware provisioning device a message with the provisioning device ID, CA digital certificates and revocation details for the DPS, and end user network credentials, as well as a number of elements. These can be signed and/or encrypted, if the connection between the DPS and the ZTS-aware provisioning device is not trusted.

The ZTS-aware provisioning device gets that message and tries to locate or discover the new device and requests its ID and a client nonce. The new device responds with its ID and the client nonce and then engages in rounds of a PAKE process, such as three rounds, to exchange PAKE Round 1 Side A values, PAKE Round 1 Side B values, PAKE Round 2 Side A values, PAKE Round 2 Side B values, PAKE Round 3 Side A values, and PAKE Round 3 Side B values, to end up with both the ZTS-aware provisioning device and the new device having a shared secret.

Having that PAKE shared secret, the new device can send the ZTS-aware provisioning device a message containing a copy of the DHA public key, a manufacturer certificate chain, all the public PAKE values signed by the DHA private key, and a list of networks that the new device sees. This message can be encrypted with PAKE shared secret.

The ZTS-aware provisioning device then verifies the certificate chain of the device manufacturer provided by the new device to determine whether to trust the new device, verifies that the DHA public key provided by the new device is the same as the one the DPS provided, and verifies the DHA signature (using the DHA public key) on the PAKE values. The ZTS-aware provisioning device could trust the DHA public key, but might also use a manufacturer-signed tuple of the DHA public key and PIN to create a link.

If all those tests are passed, the ZTS-aware provisioning device then checks the list of networks provided by the new device against networks known to the ZTS-aware provisioning device. If there is a match, the ZTS-aware provisioning device determines the network credentials to send and transmits those to the new device, encrypted with the DHA public key and encrypted using the PAKE shared secret.

With the network credentials, the new device will try to connect to the network and optionally report back the results to the ZTS-aware provisioning device, encrypted using the PAKE shared secret, which the ZTS-aware provisioning device decrypts and optionally reports to the DPS.

In the case where the new device has sufficient interface for the end user to supply the short-sequence code via the device itself, the new device can initiate a provision request with a trusted provisioning device, which might be the DPS if an open wireless network is available, or might be some other known ZTS-aware device that has or can obtain the necessary network credentials. Upon receiving a provision request that includes the short-sequence code and some device identifier, the trusted provisioning device can start the process. The new device negotiates with the trusted provisioning device so that each side securely obtains a session key such as by using the S-PAKE/J-PAKE process with the short-sequence code. The new device can then send a cert and a PAKE key signed with its private key. With that, the trusted provisioning device can verify the short-sequence code in the cert, verify the cert chain, verify the PAKE key signature and then provide the network credentials encrypted with the session key.

In another variation, the DPS generates a first keyed-hash message authentication code (HMAC) of the client nonce and a server nonce keyed with the DHA public key of the new device, then requests, from the new device, a second HMAC of the client nonce and the server nonce keyed with the DHA public key and compares the first HMAC to the second HMAC. A match between the first HMAC and the second HMAC would indicate that the new device has possession of the DHA private key that pairs with the DHA public key of the new device.

In yet another variation, the DPS extracts the client nonce from the provisioning request, generates a server nonce, generates a session key, encrypts the session key with the DHA public key to generate an encrypted session key, generates a hash of the client nonce, the server nonce, the DHA public key, and the encrypted session key, signs the hash using the DPS private key to generate a signed hash, and sends the server nonce, the encrypted session key and the signed hash to the new device.

Figure 7:
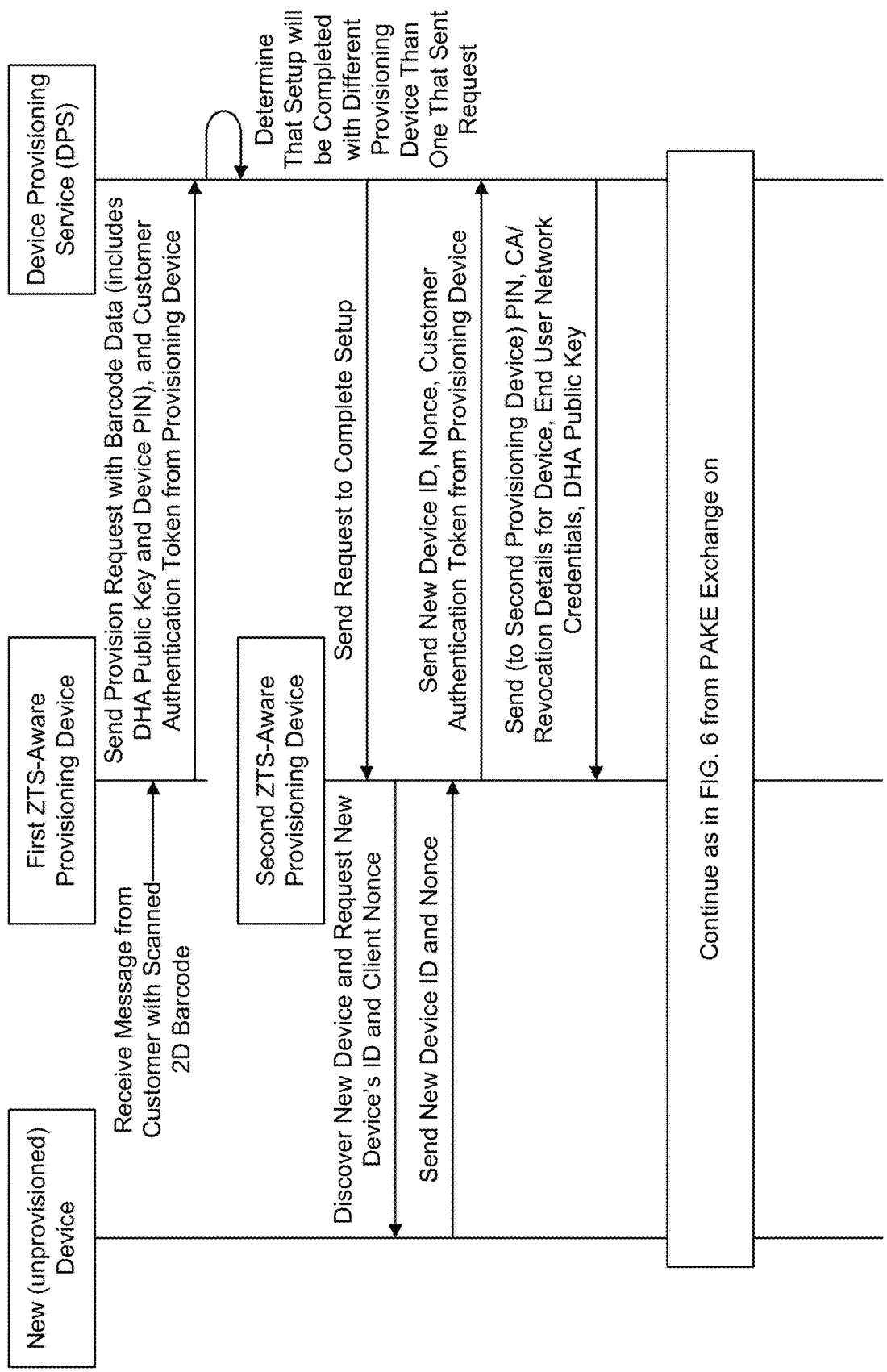
FIG. 7 illustrates a case where a first provisioning device receives a scanned barcode from an end user and the DPS uses a second provisioning device to complete the setup of a new device to be provisioned.

FIG. 7 is a swim diagram illustrating a variation where the DPS uses a different ZTS-aware provisioning device than the one that initiated the process. The process of FIG. 7 begins with a first ZTS-aware provisioning device receiving a provision code, which then sends a DPS a provision request including the provision code and a customer authentication token from the provisioning device. The DPS determines that setup will be completed with a different provisioning device.

The DPS sends the second provisioning device a message to complete the setup. The second provisioning device gets that message and tries to locate or discover the new device and requests its ID and a client nonce. The new device responds with its ID and the client nonce. The second provisioning device sends a message to the DPS including the device ID, the nonce, and a customer authentication token from the second provisioning device. The DPS replies with a PIN, certificates and revocation details, the end user network credentials, and the DHA public key. The second provisioning device and the new device then engage in rounds of a PAKE process as in FIG. 6 and the process continues as in FIG. 6.

Figure 8:
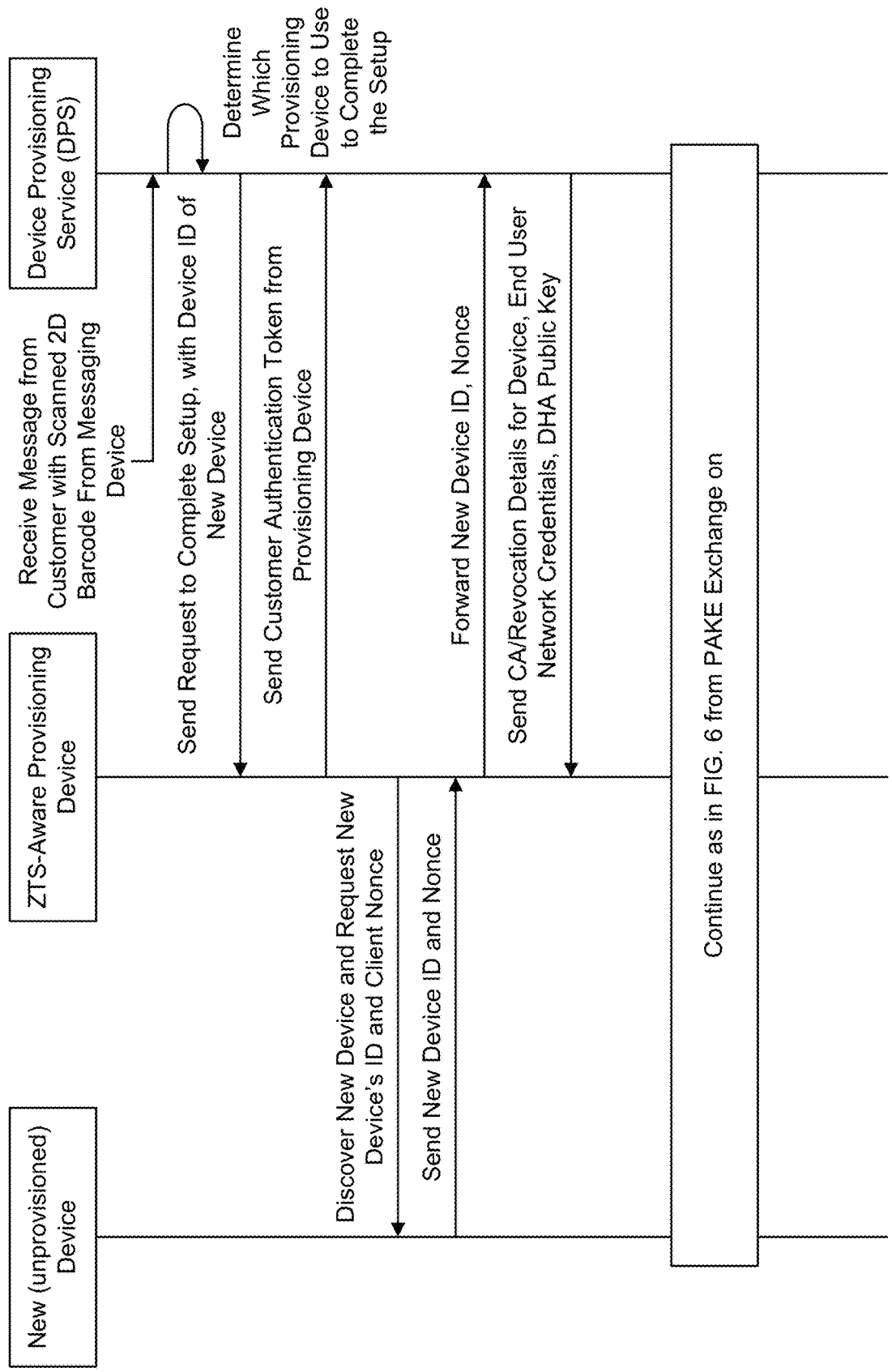
FIG. 8 illustrates a case where the DPS receives the scanned barcode from an end user independently of a provisioning device.

FIG. 8 is a swim diagram illustrating a variation where the process is initiated through a channel unrelated to any particular ZTS-aware provisioning device. It might be the case that the DPS receives a message from an end user via a voice-activated interaction device, or a smartphone app that captures a picture of a 2D barcode. Once received, the DPS determines which provisioning device to use. The provisioning device might be one that is on the end user's network already, is trusted by the end user, and can securely communicate with the DPS.

The DPS sends the provisioning device a message to complete the setup. The provisioning device gets that message and tries to locate or discover the new device and requests its ID and a client nonce. The new device responds with its ID and the client nonce. The provisioning device forwards that response to the DPS. The DPS replies with certificates and revocation details for the device, the end user network credentials, and the DHA public key. The provisioning device and the new device then engage in rounds of a PAKE process as in FIG. 6 and the process continues as in FIG. 6.

Figure 9:
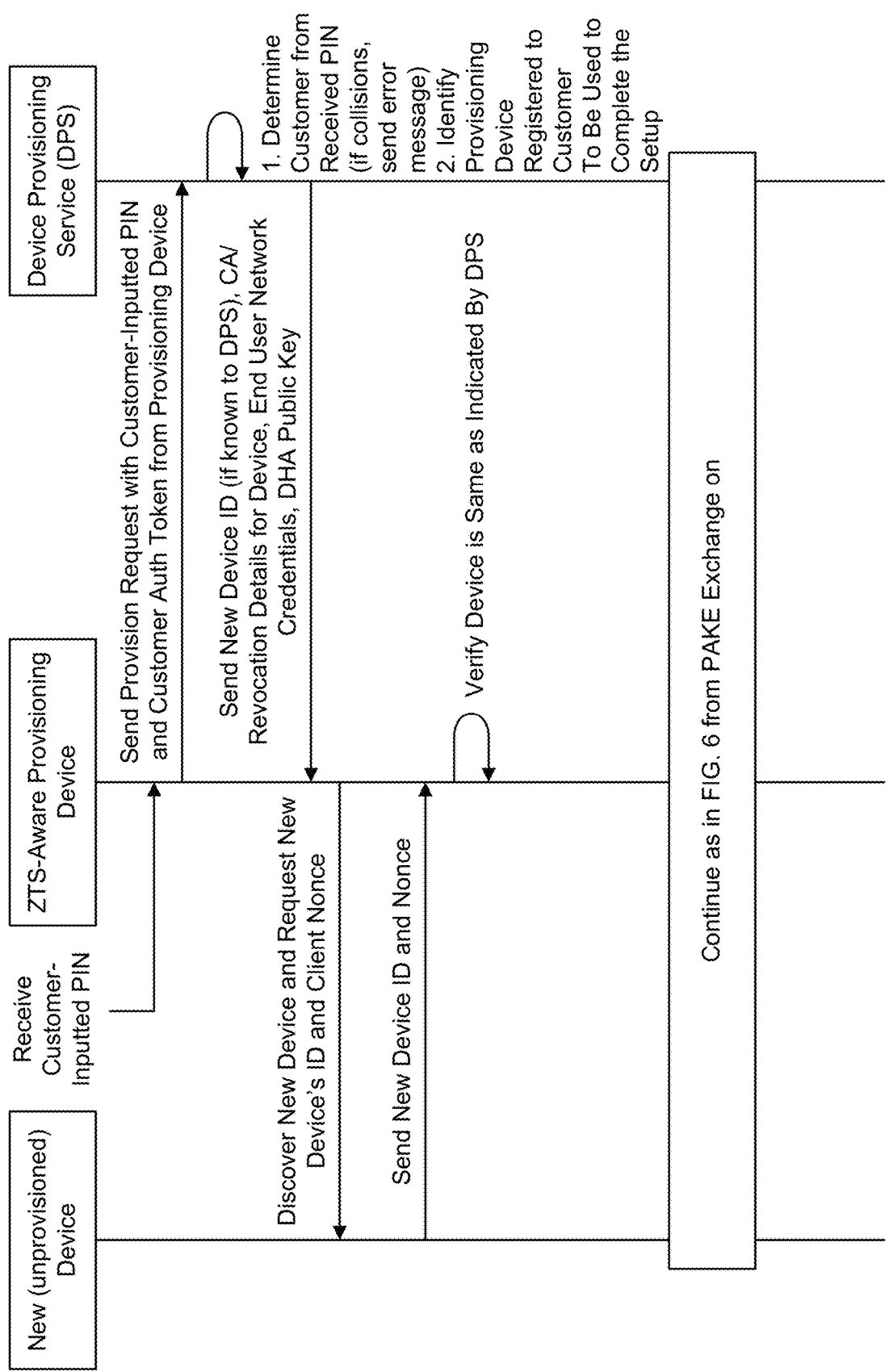
FIG. 9 illustrates a case where a provisioning device receives a customer-entered PIN from an end user and the DPS uses the provisioning device to complete the setup of a new device to be provisioned.

FIG. 9 is a swim diagram illustrating a variation where the provisioning device receives a customer-inputted PIN, such as an eight-digit code or a sequence of words. The process is similar to that of FIG. 8, but where the customer-inputted PIN might not be unique, the DPS will check for collisions before proceeding and the provisioning device performs a check to ensure that the device that the DPS determined it was dealing with is indeed the new device that is interacting with the provisioning device.

Where the DPS does not know the DHA key pair that the new device is using, a global certificate authority (CA) might sign a chain of intermediate CAs and ultimately device certificates (similar to a website's use of a CA). So, while the DPS might not be able to directly verify the DHA signature, it can verify that the device key was signed by a manufacturer that was signed by a CA that the DPS trusts. A revocation list might be maintained in case a factory loses their CA key. Some of the digits for the PIN might be reserved to help identify the new device. For example, the last few of characters of the new device's DHA key might be mapped to a number that will be part of the PIN. This way, if a provisioning device discovers multiple devices when trying to locate the new device that is to go with the PIN or provisioning code that the end user entered, the provisioning device can tell which device a specific PIN belongs to. If there are too many devices, though, there may still be collisions, which can be dealt with in other ways.

Figure 10:
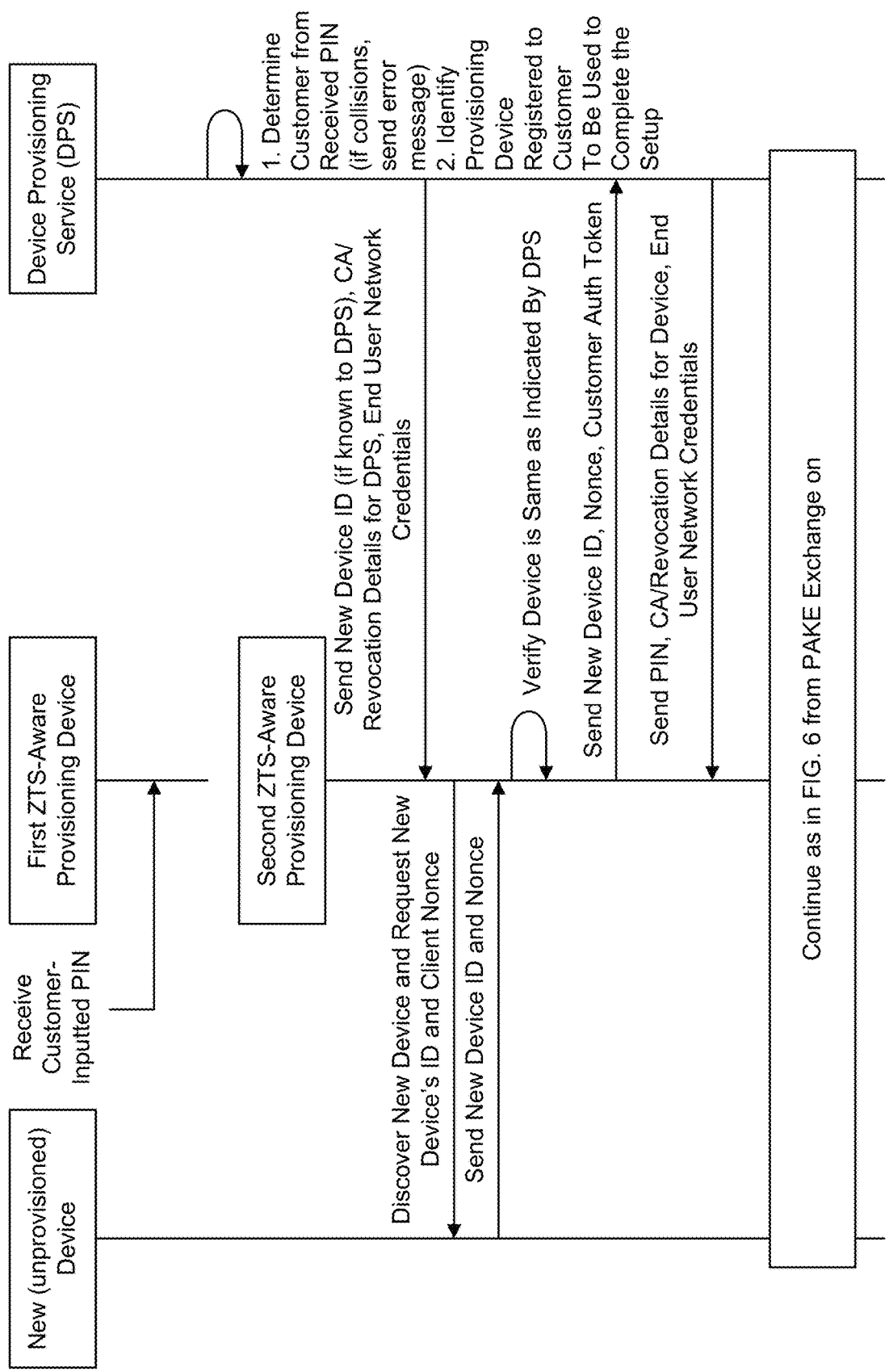
FIG. 10 illustrates a case where a first provisioning device receives a customer-entered PIN from an end user and the DPS uses a second provisioning device to complete the setup of a new device to be provisioned.

FIG. 10 is a swim diagram illustrating a variation of the process of FIG. 9, but where a first provisioning device receives the customer-inputted PIN and the DPS uses a second provisioning device to complete the process, as in FIG. 7.

Figure 11:
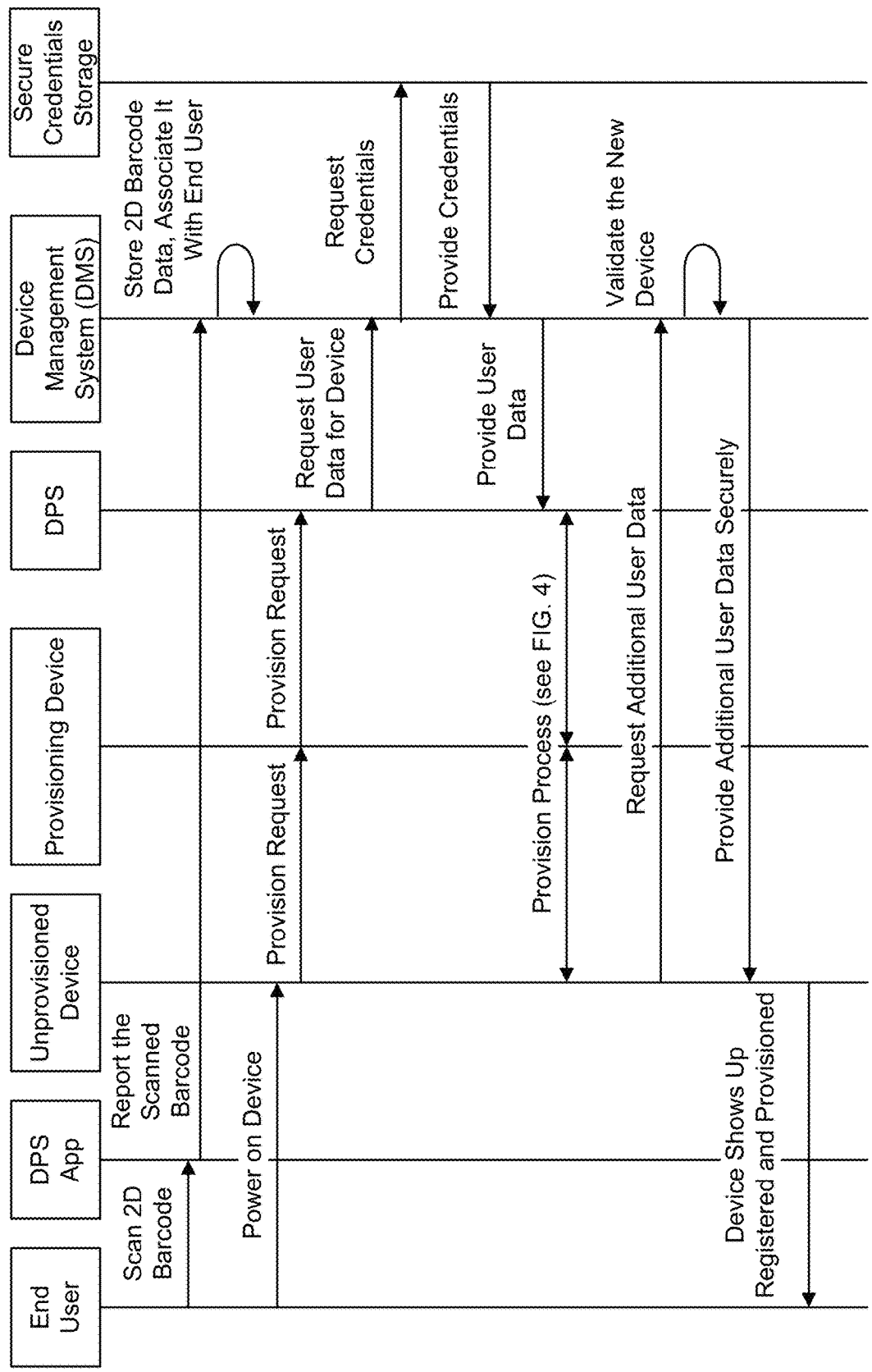
FIG. 11 is a swim diagram illustrating interactions between a new device to be provisioned and a DPS where the DPS does not already know an association of device identity with an end user account.

FIG. 11 is a swim diagram illustrating interactions between a new device to be provisioned and a DPS where the DPS does not already know the association of the device identity with an end user account known to the DPS. This might occur in the gifting situation where the device is sold through a channel that does not provide for identifying the end user in advance. If the new device is powered on, it might start the provisioning process, but the DPS will not proceed with the provisioning process if the end user-device association is not known for that device. The new device out-of-box experience (OOBE) might begin before that, with the end user (the purchaser or the ultimate end user having a wireless network to connect the new, unprovisioned device to) unpackaging the device.

By unpackaging the device, the end user can access the 2D barcode representing the provision code, as well as the short-sequence code, such as might be found on the device or in a package insert as illustrated in FIG. 2. The end user then uses a DPS app loaded onto the end user's smartphone, or another method, to scan the 2D barcode so that the DPS app has an image of the barcode. The DPS app can decode the barcode into a provision code that can be sent to a device management system (DMS) that keeps track of devices, settings, owners, etc. The DMS can store the provision code in association with the end user that is operating the DPS app.

Then, once the end user powers up the new device, the new device can proceed along the provisioning process such as that described above with reference to FIG. 4, such as sending a provisioning request to a ZTS-aware device, which forwards it to the DPS. When the DPS receives the request, if it does not have the needed user data, it can send the request to the DMS, which can in turn determine the end user associated with that new device, obtain the end user's network credentials from secure credentials storage and provide that data to the DPS. The DPS then engages in a provisioning process, such as that of FIG. 4 or others described herein.

Following that process, the new device is provisioned onto the end user's network and can then communicate directly with the DMS to provide additional data and obtain additional user data and possibly validate the new device and/or confirm completion of the provisioning process. At that point, the device just shows up as being provisioned to the end user, using a secure process that works to prevent hackers from intervening and provisioning already provisioned devices or interfering with the provisioning process.

Figure 12:
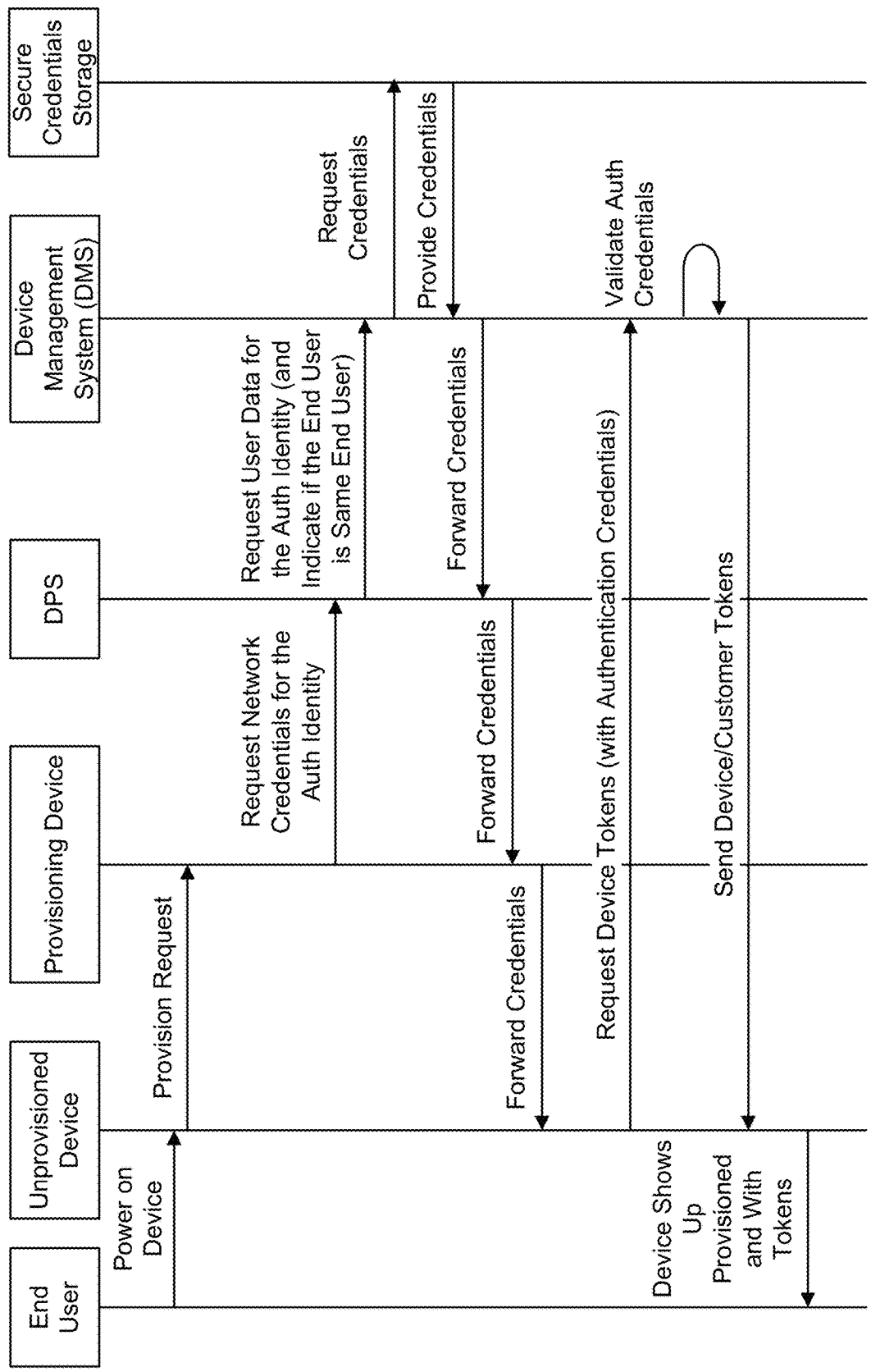
FIG. 12 is a swim diagram illustrating interactions between a device to be provisioned onto a network and a DPS where the device might have already been provisioned.

FIG. 12 is a swim diagram illustrating interactions between a device to be provisioned onto a network and a DPS where the device might have already been provisioned. Once the end user powers up the new device, the new device can proceed along the provisioning process such as that described above with reference to FIG. 4, but the end user-device association might already be known to the DPS from a prior provisioning. The new device sends a provisioning request to a ZTS-aware device. The ZTS-aware device forwards it to the DPS along with the authentication identity of the ZTS-aware device.

When the DPS receives the request, if it does not have the needed user data, it can send the request to the DMS, which can in turn obtain the end user's network credentials from secure credentials storage and provide them to the DPS. The DPS then forwards the credentials to the ZTS-aware device and the ZTS-aware device forwards the credentials to the new device.

Following that process, the new device is provisioned onto the end user's network and can then communicate directly with the DMS to request device tokens from the DMS. If the DMS validates the authentication credentials provided with the request for device tokens, the DMS responds with the device tokens.

The approach of FIG. 12 can be used in cases where the end user has a complete reconfiguration of a wireless network and many devices that connect to that wireless network. In such situations, the DPS already has maintained provisioning information for the devices if those devices provisioned previously via the ZTS process. The end user could then reconfigure their wireless network, perform the process of FIG. 11 for one ZTS-enabled and ZTS-aware device for which the end user has the provision code or the short-sequence code to get that one device provisioned. Then, with that one device being the ZTS-aware provisioning device for all the other devices that were on the network, all that the end user needs to do is cycle the power on those ZTS-enabled devices that were previously on the network and they will be provisioned. In a variation, even the power cycling step might be omitted. For example, each ZTS-aware device could be programmed to monitor for a message from another ZTS-aware device, such as the one re-provisioned device that the end user re-provisioned. The message would be a broadcast of the provisioning instruction to any listening ZTS-enabled devices (subsequent devices) that they should attempt to begin the ZTS provisioning process. The ZTS-enabled devices might also be configured to scrap prior provisioning data once such an instruction is received. The ZTS-enabled devices might perform an authentication with the provisioning device that sent the instruction, to avoid spoofing.

The instruction from the provisioning device might not be broadcast, but individually sent to each device, if the provisioning device is aware of which ZTS-enabled devices need to be re-provisioned. The instructions could be timed so that not every device is attempting re-provisioning at once. Alternatively, the provisioning device can broadcast the message and each ZTS-enabled device would wait before sending a provisioning request by some random, or otherwise spaced-apart, time delay.

Figure 13:
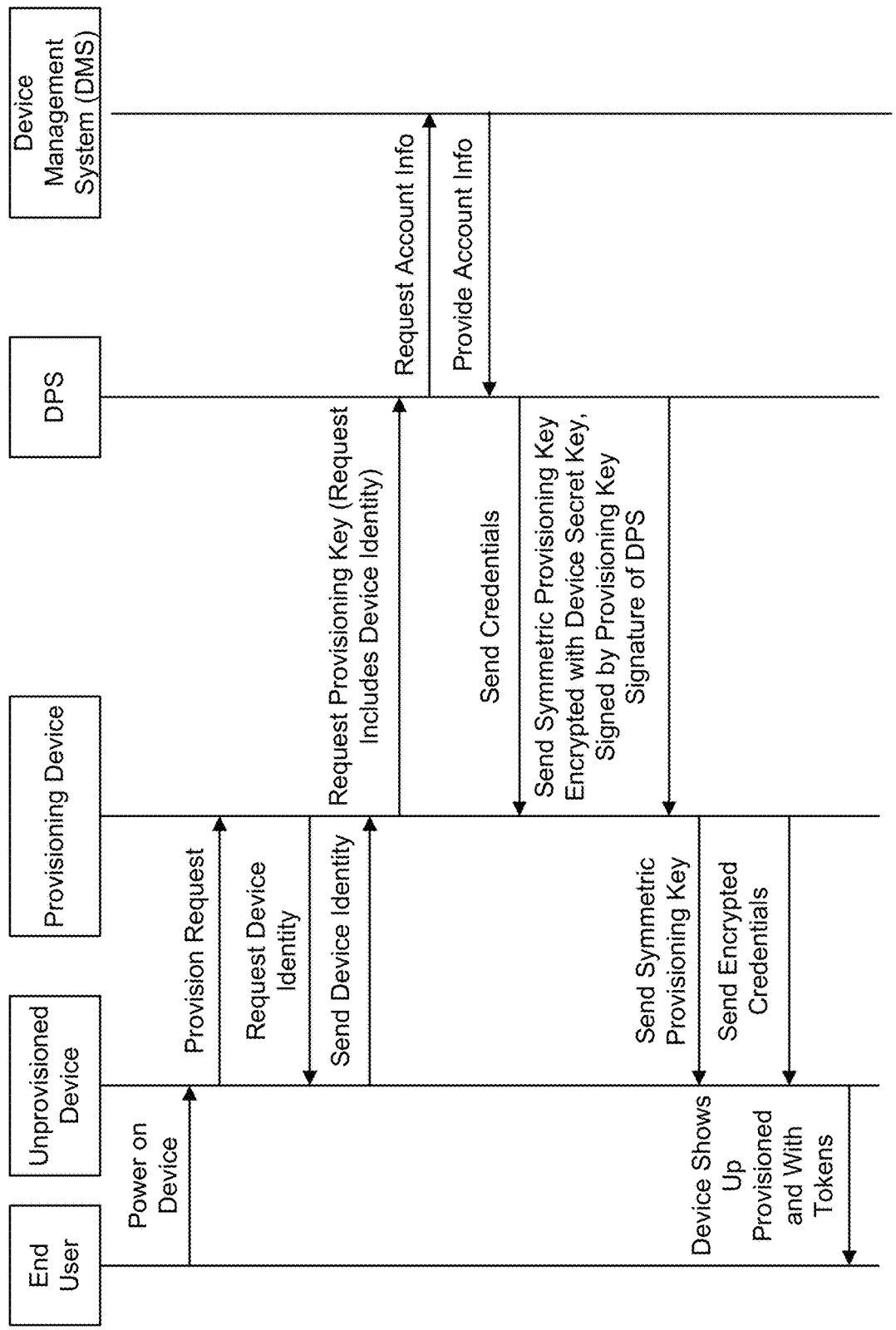
FIG. 13 is a swim diagram illustrating alternative flows of interactions between a device to be provisioned onto a network and a DPS.

FIG. 13 is a swim diagram illustrating alternative flows of interactions between a device to be provisioned onto a network and the DPS. This might be used for setting up a new device or re-provisioning an existing device. Once the end user powers up, the unprovisioned device will make a provision request that might be heard by a provisioning device. If heard, the provisioning device will request identity information from the unprovisioned device. The unprovisioned device then responds with device identity information. When the provisioning device receives that information, it sends a request for a provisioning key with the device entity to the DPS. The DSP then requests account information from the DMS, if the DPS does not already have it and then sends credentials for the unprovisioned device to the provisioning device. The DPS also sends the provisioning key as a symmetric key encrypted with the device's secret key and signed by the provisioning key of the DPS.

The provisioning device then sends the symmetric provisioning key to the unprovisioned device, along with encrypted credentials. When this step completes, the unprovisioned device will have the provisioning key, which if can use to encrypt/decrypt data and authenticate messages from the provisioning device. The encrypted channel between the provisioning device and the unprovisioned device can be set up in a number of ways.

The encrypted channel should use an authenticated setup flow, since the unprovisioned device has not authenticated the provisioning device and vice versa. Using the DPS app may provide some authentication alternatives. But, in general, a connection is established with the unprovisioned device, the provisioning device resolves the device identity of the unprovisioned device, and the provisioning device selects an authentication flow that results in a provisioning key being generated for the unprovisioned device. If secure channel setup is required, this provisioning key will be generated in such a way that only the target unprovisioned device will be able to use it. The provisioning device generates provisioning data (Wi-Fi networks, registration tokens, etc.) or potentially acquires them from the cloud. The provisioning device then provides the unprovisioned device with provisioning data encrypted and signed with the provisioning key.

For channel security, AES can be used for encryption and authentication. There are advantages of doing so. First, symmetric key encryption requires less computation at the unprovisioned device than asymmetric encryption, which can be important for low-end or low-power unprovisioned devices. Second, symmetric key encryption has fewer constraints on data size. AES encryption provides authentication in addition to encryption. This can be done using an AES cipher that supports signatures to protect against spoofing and tampering (e.g., AES-GCM).

In the case of an untrusted provisioning device, such as one that does not belong to same end user as the unprovisioned device, the provisioning device is still the orchestrator of the provisioning process, but relies on the DPS to generate, sign, and encrypt all provisioning data for the unconfigured device. This also may simplify any provisioning device SDK.

In another variation, once the unprovisioned device and the provisioning device establish some trust, the provisioning device simply acts as a passthrough and the unprovisioned device and the DPS connect securely and pass messages. Here the unprovisioned device is the orchestrator of the provisioning process once a connection has been established, so the provisioning device requires very little provisioning logic apart from the logic to discover and initiate connections to unprovisioned devices and proxy requests. In this architecture, the provisioning device can maintain a connection to the target unprovisioned device and a cloud connection simultaneously. This architecture is flexible as new registration flows can easily be added without reconfiguring the provisioning device.

However, in cases where the provisioning device is trusted and perhaps has all the needed credentials, the DPS can generate a provisioning key for the provisioning device to use directly. As a trusted relationship is established between the provisioning device and unconfigured device, the provisioning device can generate and sign data and can provide an unprovisioned device with its own networks.

Figure 14:
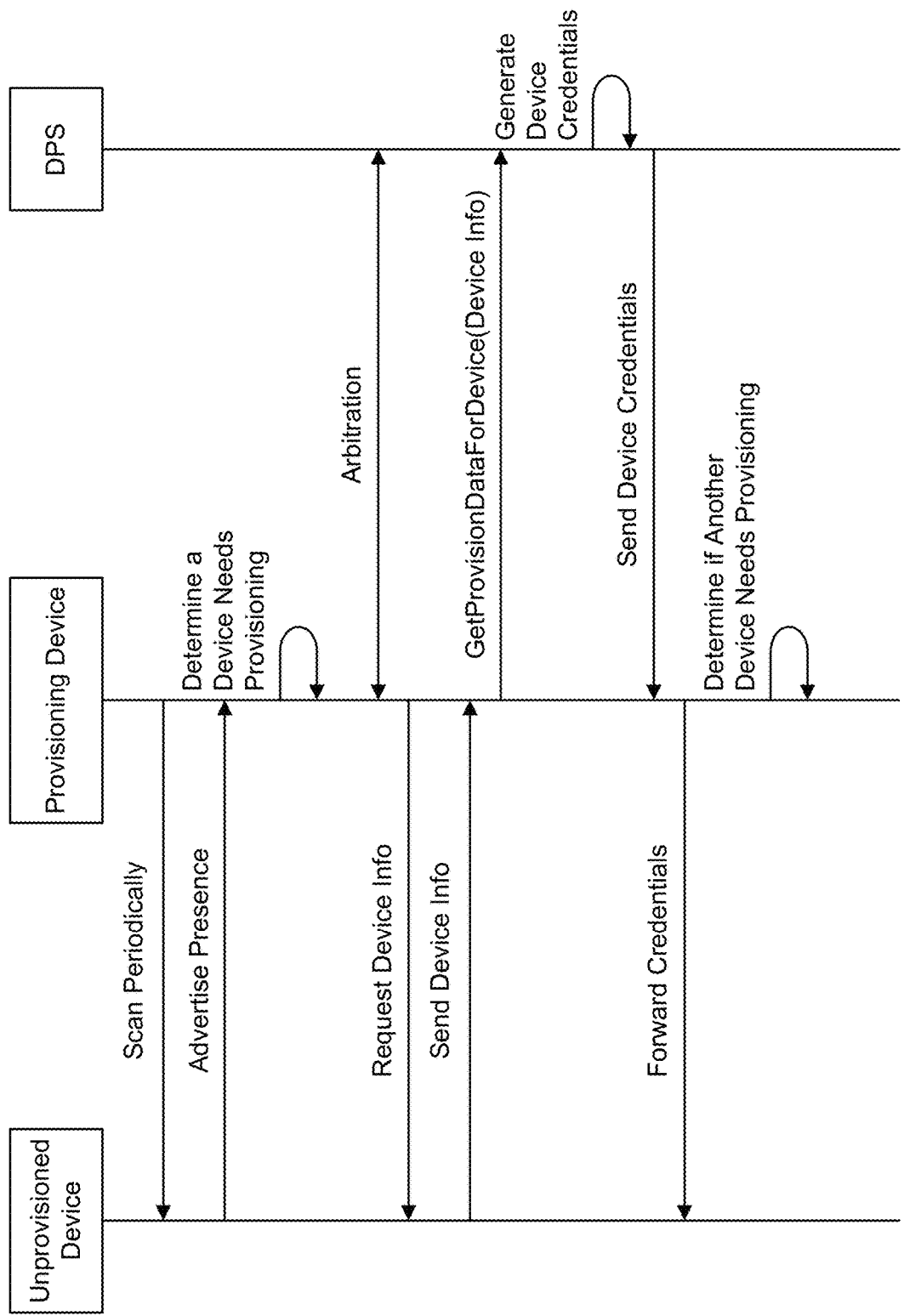
FIG. 14 is a swim diagram illustrating similar steps in more detail.

FIG. 14 is a swim diagram illustrating similar steps in more detail. As shown in FIG. 14, the provisioning device can store and reuse the device credentials for additional devices so that the entire process does not have to repeat for each unprovisioned device.

Figure 15:
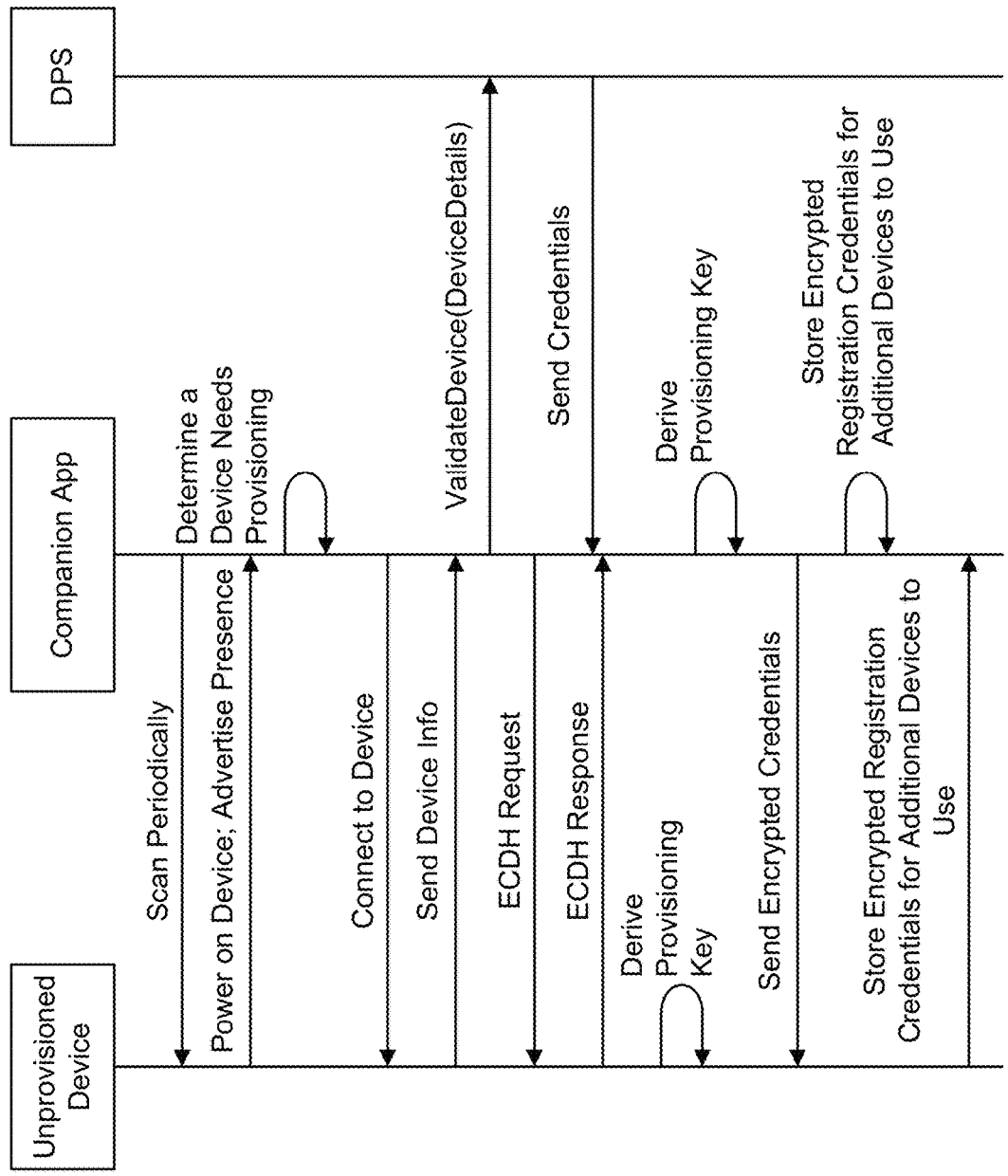
FIG. 15 is a swim diagram illustrating a process using an Elliptic Curve Diffie-Hellman (ECDH) protocol.

FIG. 15 is a swim diagram illustrating a process using an Elliptic Curve Diffie-Hellman (ECDH) protocol. In this process, a companion application, such as the DPS app, runs on a smartphone or other device of the end user and is able to communicate with the unprovisioned device. The companion application makes an ECDH request and the unprovisioned device provides an ECDH response. Both the companion application and the unprovisioned device can separately derive their provisioning key. Encryption with ECDH protects from passive eavesdropping, such as eavesdroppers sniffing Wi-Fi networks and registration credentials.

The DPS may validate device details in response to a validation request from the companion application, authenticate the companion application to determine that the new device is authorized to have network credentials of the target wireless network, and send the network credentials to the companion application for forwarding to the new device or send them to the new device through another channel.

Figure 16:
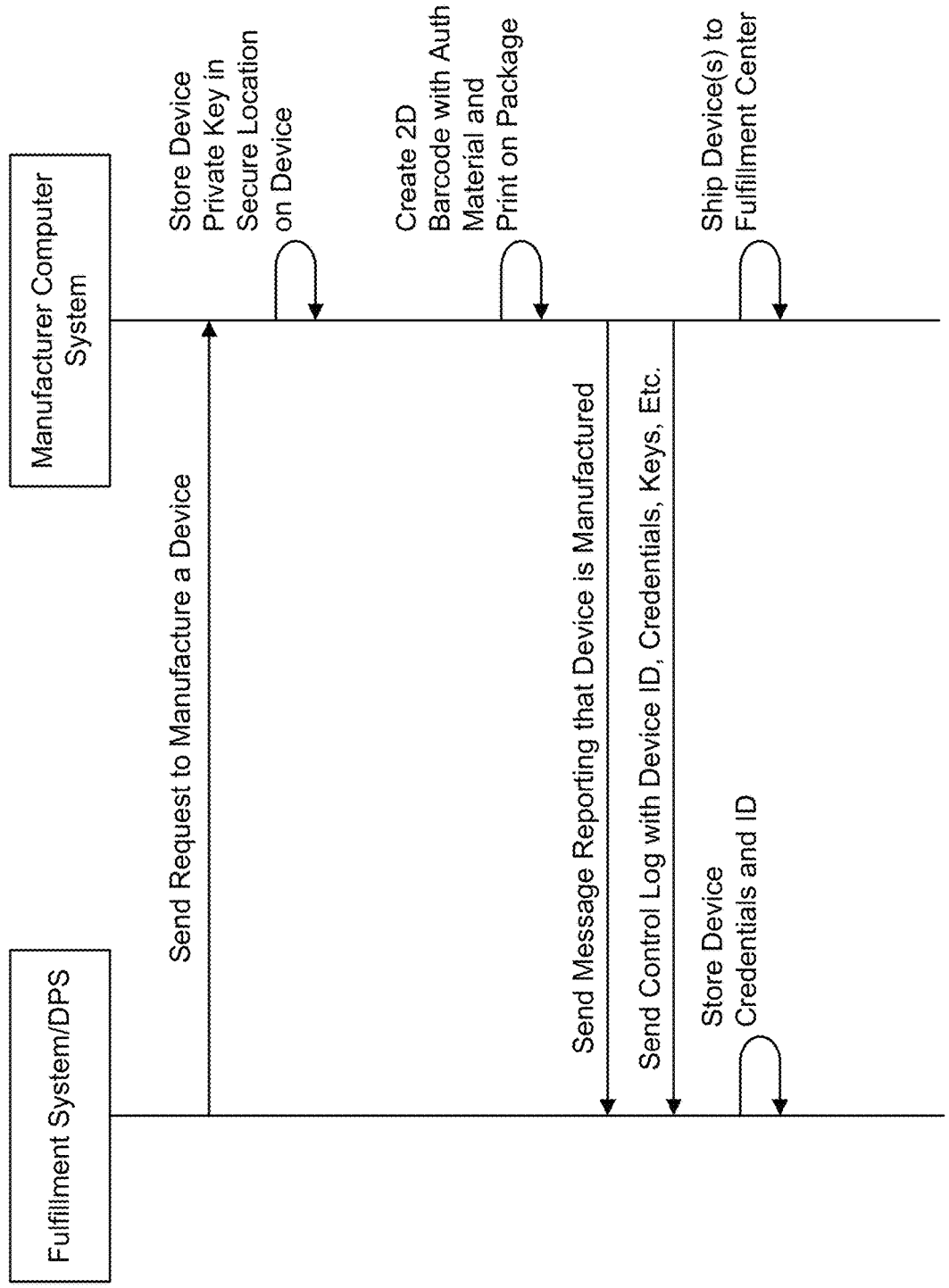
FIG. 16 illustrates the flow of a fulfillment process.

FIG. 16 illustrates the flow of a fulfillment process, wherein an online seller or fulfillment system makes a request of a manufacturer's system to trigger a device to be made or completed. The manufacturer would store the device's private key on the device securely, create a barcode to be printed on the device or packaging, and then send a message to the online seller or fulfillment system with a control log so that the online seller or fulfillment system can identify the device and securely communicate with it.

Figure 17:
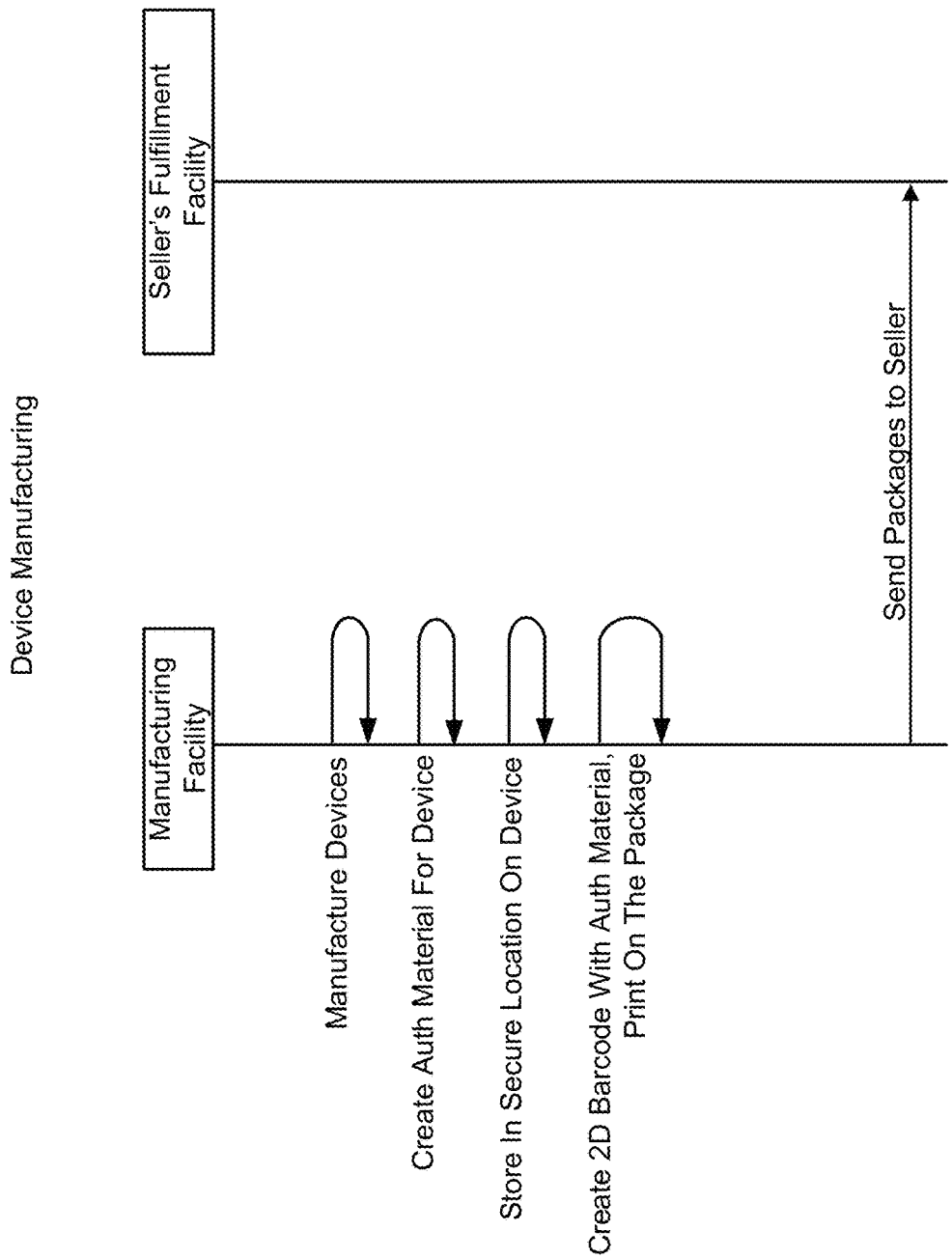
FIG. 17 illustrates a manufacturing process in greater detail.

FIG. 17 illustrates a manufacturing process in greater detail.

Figure 18:
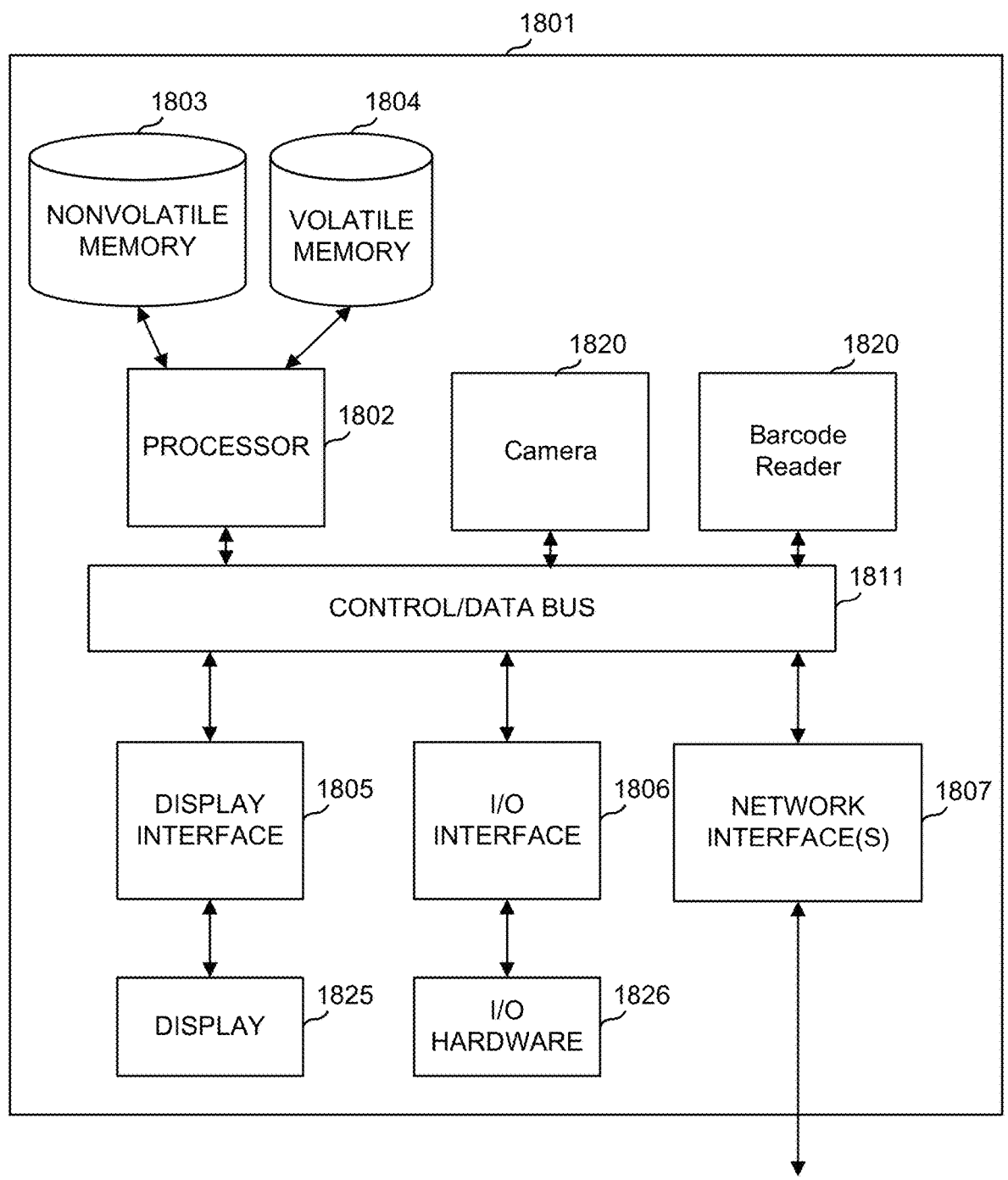

FIG. 18 is a block diagram of an example of computing hardware that might be present in a provisioning device, an unprovisioned device, a DPS or the like. Computing hardware 1801 in FIG. 18 is shown comprising a processor 1802, non-volatile memory 1803, volatile memory 1804, a display interface 1805, an input/output ("I/O") interface 1806, and network interface(s) 1807. Each of these components can communicate via a control/data bus 1810. Network interface(s) 1807 might include Ethernet, USB, wireless, or other interconnections. Display interface 1805 is coupled to a display 1825 and I/O interface 1806 is coupled to I/O hardware 1826. Other elements, such as power supplies and power connections might be present although not shown. Examples of computing hardware might include embedded devices, desktop computers, or the like and might include other subsystems not shown in FIG. 18. Computing hardware 1801 might also include a camera 1820 for capturing images and a barcode reader 1820 for reading barcodes in other ways.

Processor 1802 may be configured to access memory and execute computer-executable instructions loaded therein. For example, the processor 1802 may be configured to execute computer-executable instructions of various program modules to cause or facilitate various operations to be performed in accordance with one or more embodiments of this disclosure. Processor 1802 may include any suitable processing unit capable of accepting data as input, processing the input data in accordance with stored computer-executable instructions, and generating output data. Processor 1802 may include any type of suitable processing unit including, but not limited to, a central processing unit, a microprocessor, a Reduced Instruction Set Computer ("RISC") microprocessor, a Complex Instruction Set Computer ("CISC") microprocessor, a microcontroller, an Application Specific Integrated Circuit ("ASIC"), a Field-Programmable Gate Array ("FPGA"), a System-on-a-Chip ("SoC"), a digital signal processor ("DSP"), and so forth. Further, processor 1802 may have any suitable microarchitecture design that includes any number of constituent components such as, for example, registers, multiplexers, arithmetic logic units, cache controllers for controlling read/write operations to cache memory, branch predictors, or the like. The microarchitecture design of processor 1802 may be capable of supporting any of a variety of instruction sets.

Non-volatile memory 1803 may include read-only memory ("ROM"), flash memory, ferroelectric RAM ("FRAM"), various types of unalterable ROM, and/or writeable variants of ROM such as electrically erasable programmable read-only memory ("EEPROM"), and so forth. Non-volatile memory 1803 may include removable storage and/or non-removable storage including, but not limited to, magnetic storage, optical disk storage, and/or tape storage. Non-volatile memory 1803 may provide non-volatile storage of computer-executable instructions and other data. Non-volatile memory 1803, removable and/or non-removable, is an example of computer-readable storage media ("CRSM") as that term is used herein.

Non-volatile memory 1803 may store computer-executable code, instructions, or the like executable by processor 1802 to cause processor 1802 to perform or initiate various operations. Moreover, output data generated as a result of execution of the computer-executable instructions by processor 1802 may be stored in non-volatile memory 1803. Non-volatile memory 1803 may store one or more operating systems ("O/S"), one or more database management systems ("DBMS"), and program modules, applications, or the like. Any of the program modules may include one or more sub-modules.

Volatile memory 1804 may include random access memory ("RAM"), static random access memory ("SRAM"), various types of dynamic random access memory ("DRAM"), and so forth. Volatile memory 1804 may include main memory as well as various forms of cache memory such as instruction cache(s), data cache(s), translation lookaside buffer(s) ("TLBs"), and so forth. Further, cache memory such as a data cache may be a multi-level cache organized as a hierarchy of one or more cache levels (L1, L2, etc.). Volatile memory 1804 is an example of computer-readable storage media ("CRSM") as that term is used herein.

Network interface(s) 1807 might also allow processor 1802 to send and receive data from other networked resources, such as servers, clients, devices, etc. that are able to communicate over cable networks, public networks (e.g., the Internet), private networks (e.g., frame-relay networks), wireless networks, cellular networks, telephone networks (e.g., a public switched telephone network), or any other suitable private or public packet-switched or circuit-switched networks. In addition, network interface(s) 1807 might be used for communication using associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial ("HFC") medium, a microwave medium, a radio frequency communication medium, a satellite communication medium, or any combination thereof.

Control/data bus 1810 may include at least one of a system bus, a memory bus, an address bus, or a message bus, and may permit exchange of information between various components of the computing hardware 1801. Control/data bus 1810 may include, without limitation, a memory bus or a memory controller, a peripheral bus, an accelerated graphics port, and so forth. Control/data bus 1810 may be associated with any suitable bus architecture including, without limitation, an Industry Standard Architecture ("ISA"), a Micro Type Architecture ("MCA"), an Enhanced ISA ("EISA"), a Video Electronics Standards Association ("VESA") architecture, an Accelerated Graphics Port ("AGP") architecture, a Peripheral Component Interconnects ("PCI") architecture, a PCI-Express architecture, a Universal Serial Bus ("USB") architecture, and so forth.

Figure 19:
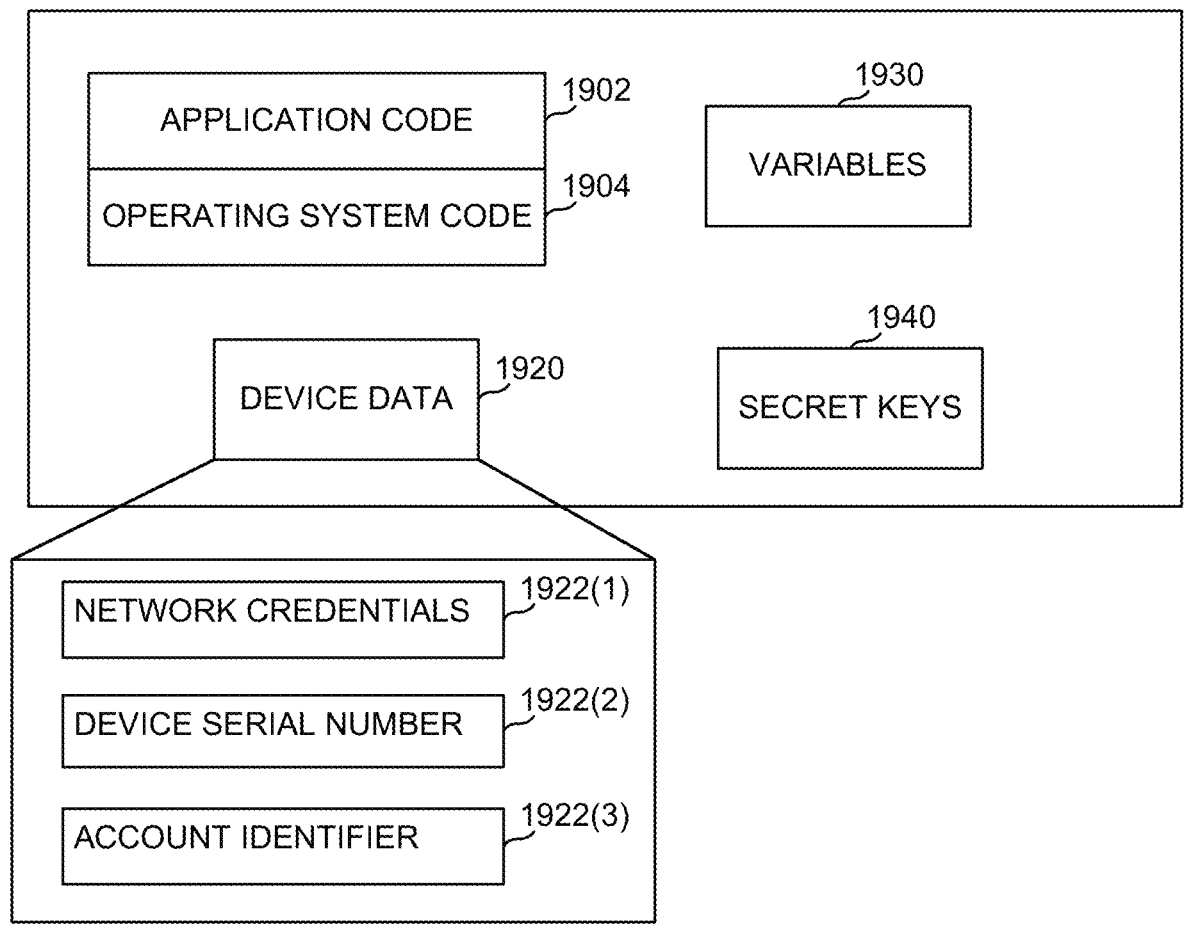
FIG. 19 is a block diagram of an example of non-volatile memory structures as might be used to implement functions described herein.

FIG. 19 is a block diagram of an example of non-volatile memory structures as might be used in a processor to implement functions described herein. The memory structures include storage for application code 1902, operating system code 1904, device data storage 1920, storage 1930 for variables, and storage 1940 for secret keys and private keys. In this example, the non-volatile memory structures for device data storage comprise network credentials 1922(1), device serial numbers 1922(2), and account identifiers 1922(3).

As explained herein, a provisioning device operates with a DPS to provision a new network-enabled device onto a target wireless network. This can be done by printing a machine-readable representation of a provision code onto the network-enabled device or internal packaging of the device, wherein the provision code comprises a product identifier of the device, a unique serial number for device within a manufacturer's namespace, and a device public key of the device. The device sends a provisioning request to a device provisioning server through a provisioning device having a network connection usable to connect to the device provisioning server. An interface is provided to read the machine-readable representation of the provision code and provide the provision code to the device provisioning server through a channel other than communication from the device. A data record might be stored that associates the provision code with an owner of the wireless network and network credentials for the wireless network stored in a secured database of network credentials containing multiple network credentials for multiple end users, wherein network credentials for the wireless network are based on the owner of the wireless network in the data record. Mutual authentication between the device and the DPS might occur before encrypting the network credentials with the DHA public key to generate encrypted network credentials and send, digitally signed, to the new device through the provisioning device.

The various embodiments further can be implemented in a wide variety of operating environments, which in some cases can include one or more user computers, computing devices or processing devices that can be used to operate any of a number of applications. Such a system also can include a number of workstations running any of a variety of commercially available operating systems and other known applications. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UPnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims. While the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B or C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B or C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with computer-executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The non-transitory computer-readable storage medium may have stored thereon executable instructions that, as a result of being executed by one or more processors of a computer system, cause the computer system to perform various operations described herein.

In some embodiments, the code is stored on set of one or more non-transitory computer-readable storage media having stored thereon computer-executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of provisioning a device for use with a wireless network, wherein provisioning the device provides the device with data needed to connect to the wireless network, the method comprising:

printing a machine-readable representation of a provision code onto the device or internal packaging of the device, wherein the provision code comprises a product identifier of the device, a unique serial number for the device within a manufacturer's namespace, and a device public key of the device;

sending, by the device, a provisioning request to a device provisioning server through a provisioning device having a network connection usable to connect to the device provisioning server;

providing, from an interface able to read the machine-readable representation of the provision code, the provision code to the device provisioning server through a channel other than communication from the device;

storing a data record associating the provision code with an owner of the wireless network;

obtaining, using the device provisioning server, network credentials for the wireless network from a secured database of network credentials containing multiple network credentials for multiple end users, wherein network credentials for the wireless network are based on the owner of the wireless network in the data record;

authenticating, at the device, the device provisioning server to the device, to determine that the device provisioning server is authentically the device provisioning server and not another device pretending to be the device provisioning server;

authenticating, at the device provisioning server, the device to the device provisioning server, to determine that the device is authentically the device and not another device pretending to be the device;

encrypting, at the device provisioning server, the network credentials with the device public key of the device to generate encrypted network credentials;

digitally signing, at the device provisioning server, the encrypted network credentials to generate a network credentials signature;

sending, from the device provisioning server, the encrypted network credentials and the network credentials signature to the device through the provisioning device;

decrypting, by the device, the encrypted network credentials to generate decrypted network credentials;

authenticating, at the device, the decrypted network credentials using the network credentials signature; and configure, using the device, a network interface of the device to connect to the wireless network using the decrypted network credentials.

2. The computer-implemented method of claim 1, wherein the machine-readable representation of the provision code comprises a two-dimensional printed barcode image, the method further comprising:

providing a user interface, on a side channel device, for initiating uploading the provision code to the device provisioning server, the side channel device being independent of the device;

sending, using the user interface, an identifier of an end user;

providing a camera interface on the side channel device for capturing the two-dimensional printed barcode image to generate a data representation of the provision code into memory;

sending the data representation of the provision code from the side channel device to the device provisioning server;

determining, based on the identifier of the end user, the network credentials; and determining, based on the provision code, a device identity of the device and the device public key of the device.

3. The computer-implemented method of claim 2, further comprising:
  determining if the device provisioning server has associated network credentials associated with the end user;
  if the device provisioning server does not have the associated network credentials, requesting the associated network credentials using the user interface;
  obtaining the associated network credentials and storing the associated network credentials and associating the associated network credentials with the end user; and
  wherein to generate the encrypted network credentials, encrypting the associated network credentials with the device public key.

4. A network-enabled device capable of communicating over a network, comprising:
  one or more processors;
  memory storing a unique device identifier and a device private key that is associated with a printed code of the network-enabled device, wherein the device private key is part of an asymmetric key pair with a device public key of the network-enabled device; and
  memory to store computer-executable instructions that, if executed, cause the one or more processors to:
    (1) initialize the network-enabled device following application of power to the network-enabled device;
    (2) determine whether the network-enabled device is in an unprovisioned state, the unprovisioned state being a state where the network-enabled device lacks network credentials to connect to a target wireless network;
    (3) send a provisioning request with the device unique identifier;
    (4) receive a response to the provisioning request from a second device, wherein the second device has access to the target wireless network;
    (5) extract, from the response, encrypted network credentials and a network credentials signature of a device provisioning server, wherein the network credentials are credentials associated with the target wireless network;
    (6) from the response, and using the network credentials signature of the device provisioning server, determine an identity of the device provisioning server;
    (7) authenticate that the response was authorized by the device provisioning server;
    (8) decrypt the encrypted network credentials to generate decrypted network credentials; and
    (9) configure a network interface of the network-enabled device to connect to the target wireless network using the decrypted network credentials.

5. The network-enabled device of claim 4, wherein the printed code comprises a machine-readable representation of a provision code comprising a product identifier of the network-enabled device, a unique serial number for the network-enabled device, and the device public key of the network-enabled device.

6. The network-enabled device of claim 4, wherein the printed code comprises a representation of a short-sequence code in human-readable form and visible only after the network-enabled device is unpackaged from packaging materials, wherein the printed code corresponds to a stored code available to the device provisioning server and present in a data record that provides a device-code association associating the printed code with the network-enabled device.

7. The network-enabled device of claim 6, wherein the short-sequence code comprises a sequence of digits usable for end user entry into a user interface of a side channel device that provides a side channel to the device provisioning server and is distinct from the network-enabled device.

8. The network-enabled device of claim 6, wherein the short-sequence code comprises a sequence of words, printed on the device or internal device packaging, and wherein the sequence of words maps to a numerical short-sequence code that is providable to the device provisioning server for use in associating the network-enabled device with an end user of the target wireless network.

9. The network-enabled device of claim 4, wherein the memory to store computer-executable instructions further comprises computer-executable instructions that, if executed, cause the one or more processors to:
  (10) determine an identity of the second device; and
  (11) authenticate, to the network-enabled device, that the second device as a device on the target wireless network, to determine that the second device is authentically the second device and not another device pretending to be the second device.

10. A non-transitory computer-readable storage medium having stored thereon executable instructions that, as a result of being executed by one or more processors of a computer system, cause the computer system to at least:
  receive a provisioning request from a network-enabled device when the network-enabled device is in an unprovisioned state, the unprovisioned state being a state where the network-enabled device lacks network credentials to connect to a target wireless network;
  obtain a provision code for the network-enabled device, wherein the provision code matches a machine-readable representation of the provision code printed on the network-enabled device or internal device packaging, wherein the provision code comprises a product identifier of the network-enabled device, a unique serial number for the network-enabled device, and a device public key of the network-enabled device, wherein the device public key is part of an asymmetric key pair with a device private key of the network-enabled device;
  identify, using the provision code, a user account associated with the network-enabled device;
  identify network credentials for the user account, wherein the network credentials are sufficient for the network-enabled device to connect to the target wireless network;
  authenticate the network-enabled device to determine that the network-enabled device is authorized by an end user of the target wireless network to access the target wireless network;
  encrypt the network credentials with the device public key to generate encrypted network credentials;
  digitally sign the encrypted network credentials to generate a network credentials signature; and
  send the encrypted network credentials and the network credentials signature to the network-enabled device through a provisioning device that is connected to the target wireless network.

11. The non-transitory computer-readable storage medium of claim 10, further comprising executable instructions that, as the result of being executed by the one or more processors of the computer system, cause the computer system to at least:

determine whether the provisioning device is capable of facilitating provisioning of the network-enabled device; and authenticate the provisioning device to determine that the provisioning device is authentically the provisioning device and not another device pretending to be the provisioning device.

12. The non-transitory computer-readable storage medium of claim 10, further comprising executable instructions that, as the result of being executed by the one or more processors of the computer system, cause the computer system to at least:

extract from the provisioning request, a client nonce generated by the network-enabled device;

generate a server nonce;

generate a session key;

encrypt, with the device public key, the session key to generate an encrypted session key of the network-enabled device;

generate a hash of the client nonce, the server nonce, the device public key, and the encrypted session key;

sign the hash using a private key of a device provisioning server to generate a signed hash; and send the server nonce, the encrypted session key and the signed hash to the network-enabled device.

13. The non-transitory computer-readable storage medium of claim 10, further comprising executable instructions that, as the result of being executed by the one or more processors of the computer system, cause the computer system to at least:

generate a first keyed-hash message authentication code (HMAC) of the client nonce and the server nonce keyed with the device public key of the network-enabled device;

request, from the network-enabled device, a second HMAC of the client nonce and the server nonce keyed with the device public key of the network-enabled device; and compare the first HMAC to the second HMAC, whereby a match between the first HMAC and the second HMAC indicates that the network-enabled device has possession of the device private key of the network-enabled device that pairs with the device public key of the network-enabled device.

14. The non-transitory computer-readable storage medium of claim 10, further comprising executable instructions that, as the result of being executed by the one or more processors of the computer system, cause the computer system to at least obtain the provision code via the companion application, wherein the provision code is inputted into the companion application by an end user of the network-enabled device;

determine an end user account associated with the end user of the network-enabled device; and associate the end user account with the user account associated with the network-enabled device.

15. The non-transitory computer-readable storage medium of claim 10, further comprising executable instructions that, as the result of being executed by the one or more processors of the computer system, cause the computer system to at least:

validate device details in response to a validation request from a companion application;

authenticate the companion application to determine that the network-enabled device is authorized to have network credentials of the target wireless network; and send the network credentials to the companion application for forwarding to the network-enabled device.

16. The non-transitory computer-readable storage medium of claim 10, further comprising executable instructions that, as the result of being executed by the one or more processors of the computer system, cause the computer system to at least:

determine that the companion application is able to obtain a valid Elliptic Curve Diffie-Hellman (ECDH) response from the network-enabled device; and send the network credentials to the companion application.

17. The non-transitory computer-readable storage medium of claim 10, further comprising executable instructions that, as the result of being executed by the one or more processors of the computer system, cause the computer system to at least:

obtain a short-sequence code provided by the end user of the target wireless network, the short-sequence code being visible on the network-enabled device or on internal device packaging only after the network-enabled device is unpackaged from packaging materials;

determine whether a requesting device is requesting provisioning;

determine a requesting device short-sequence code associated with the requesting device;

determine if the requesting device short-sequence code matches the short-sequence code provided by the end user;

associate the requesting device with the end user when the requesting device short-sequence code matches the short-sequence code provided by the end user; and using a requesting device provision code of the requesting device as the provision code of the network-enabled device when the requesting device short-sequence code matches the short-sequence code provided by the end user.

18. The non-transitory computer-readable storage medium of claim 10, further comprising executable instructions that, as the result of being executed by the one or more processors of the computer system, cause the computer system to at least:

parse the short-sequence code provided by the end user into a sequence of words, wherein the short-sequence code is a word-based short-sequence code;

look up a mapping of words to numbers used for short-sequence codes; and convert the word-based short-sequence code into a numerical short-sequence code to use as the short-sequence code.

19. The non-transitory computer-readable storage medium of claim 10, further comprising executable instructions that, as the result of being executed by the one or more processors of the computer system, cause the computer system to at least:

query a device management system to obtain a history associated with the provision code to determine if the network-enabled device had been previously provisioned; and requesting additional verification prior to re-provisioning the network-enabled device if it had been previously provisioned.

20. The non-transitory computer-readable storage medium of claim 10, further comprising executable instructions that, as the result of being executed by the one or more processors of the computer system, cause the computer system to at least:

determine whether the provisioning device is capable of facilitating provisioning of the network-enabled device; and sending a provisioning key to the network-enabled device encoded such that the provisioning key is unusable by the provisioning device but is usable by the network-enabled device.

* * * * *